United States Patent
Beheshti

(10) Patent No.: US 12,528,480 B1
(45) Date of Patent: Jan. 20, 2026

(54) MITIGATION OF SAFETY RISKS FOR LOSS OF VEHICLE SAFETY COMPONENTS

(71) Applicant: Zoox, Inc., Foster City, CA (US)

(72) Inventor: Seyed Parsa Beheshti, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 144 days.

(21) Appl. No.: 18/394,760

(22) Filed: Dec. 22, 2023

(51) Int. Cl.
| | |
|---|---|
| B60W 50/029 | (2012.01) |
| B60W 30/14 | (2006.01) |
| B60W 30/18 | (2012.01) |
| B60W 50/02 | (2012.01) |
| B60W 60/00 | (2020.01) |

(52) U.S. Cl.
CPC ........ B60W 50/029 (2013.01); B60W 30/146 (2013.01); B60W 30/18163 (2013.01); B60W 50/0205 (2013.01); B60W 60/0015 (2020.02); *B60W 2050/021* (2013.01); *B60W 2520/06* (2013.01); *B60W 2554/4029* (2020.02); *B60W 2554/4045* (2020.02); *B60W 2554/406* (2020.02); *B60W 2555/60* (2020.02)

(58) Field of Classification Search
None
See application file for complete search history.

(56) References Cited

U.S. PATENT DOCUMENTS

| | | | | |
|---|---|---|---|---|
| 4,348,613 | A * | 9/1982 | Hormel | B60Q 11/005 315/130 |
| 10,649,459 | B2 | 5/2020 | Wang et al. | |
| 10,800,455 | B2 * | 10/2020 | Micks | B62D 6/00 |

FOREIGN PATENT DOCUMENTS

TW   M595300 U  *  5/2020

OTHER PUBLICATIONS

Machine English translation of TWM595300U (Year: 2025).*

* cited by examiner

*Primary Examiner* — Jason Holloway
*Assistant Examiner* — Atticus A Cameron
(74) *Attorney, Agent, or Firm* — Lee & Hayes, P.C.

(57) ABSTRACT

Techniques for mitigating risks of a vehicle when turn signal(s) become inoperable are described herein. A vehicle may have turn signal indicators configured to indicate a navigational intent of the vehicle to the proximate object(s). In some examples, turn signal indicators may become inoperable due to a failure of the turn signal indicator and/or a failure of the turn signal controller. Based on determining that the turn signal indicator(s) is inoperable, the vehicle may determine a position of the turn signal indicator(s) on the vehicle (e.g., front right, back right, front left, back left, right side, etc.). The vehicle may use the position data to determine an action for the vehicle to follow. As such, the vehicle may be controlled based on the action.

20 Claims, 7 Drawing Sheets

MITIGATION OF SAFETY RISKS FOR LOSS OF VEHICLE SAFETY COMPONENTS

BACKGROUND

Safety systems on a vehicle, such as lights, may, for example, provide cues regarding present or future behavior of that vehicle. For example, a driver of a vehicle may use a turn signal to indicate an intent to change lanes or turn. However, in some cases, the failure of such turn signals may result in inefficient and/or suboptimal operations for the vehicle with the failed turn signal and/or other vehicles in the environment of the vehicle with the failed turn signal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
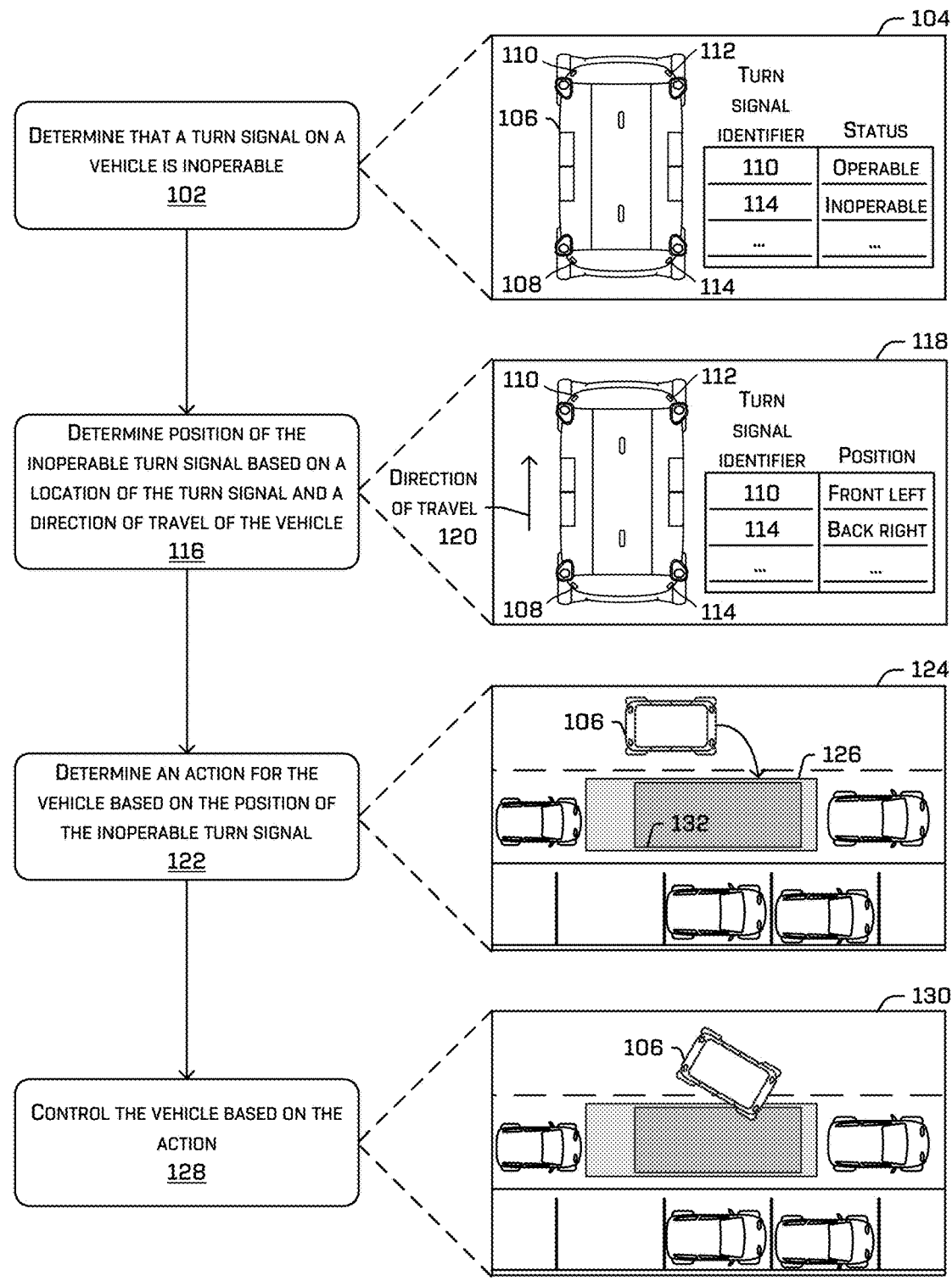
FIG. 1 is a pictorial flow diagram illustrating an example technique for determining an action for a vehicle to follow based on a turn signal being inoperable, in accordance with one or more examples of the disclosure.

As discussed above, in some circumstances, existing techniques for determining vehicle actions when one or more vehicle components (e.g., turn signals) become inoperable may result in inefficient and/or suboptimal operations for the vehicle with the inoperable components (e.g., failed turn signal) and/or other vehicles in the environment of the vehicle with the failed components (e.g., turn signal).

Techniques for mitigating risks of a vehicle when one or more turn signals become inoperable are described herein. In some examples, a vehicle (such as an autonomous vehicle) may have one or more turn signal indicators configured to indicate a navigational intent of the vehicle to proximate object(s). The turn signal indicators can represent the intent of the vehicle by illuminating prior to and/or during a driving maneuver (e.g., lane change, road change, etc.). In some examples, turn signal indicators may become inoperable due to a failure of the turn signal indicator (e.g., broken light, disconnected or broken wiring, etc.) and/or a failure of the turn signal controller (e.g., the turn signal indicator may not receive a signal or instruction to operate). Based on determining that one or more of the turn signal indicators are inoperable, the vehicle may determine a position of the turn signal indicator(s) on the vehicle (e.g., front right, back right, front left, back left, right side, etc.). In such examples, the vehicle may use the position data to determine an action (minimizing the risks to the vehicle, the passenger(s) of the vehicle, and/or the proximate object(s)) for the vehicle to follow. As such, the vehicle may be controlled based on the action. As described in more detail below, the techniques described herein may improve vehicle safety and/or driving efficiency by determining actions that account for the inoperability of the turn signal indicators, thereby enabling the vehicle to perform efficient and safe actions.

Conventional techniques for operating a vehicle with one or more inoperable turn signals may lead to inefficient and/or suboptimal results. For example, a vehicle navigating an environment may include multiple turn signals (e.g., turn signal indicator, turning lights, blinker, etc.) configured to inform object(s) in the environment proximate the vehicle about the vehicle's intended direction of travel. That is, the vehicle may include one or more turn signals at each corner of the vehicle. Further, prior to performing a specific maneuver (e.g., lane change, turning maneuver, etc.), the vehicle can cause one or more of the turn signals to illuminate such as to inform the object(s) in the environment of the vehicle's future action. In some examples, using such turn signals may be important to allow the vehicle to navigate amongst various dynamic objects safely and efficiently. However, in some examples, one or more of the turn signals may fail or become inoperable (e.g., light goes out, turn signal controller fails (e.g., controller cannot send signals to the turn signal indicator(s)), etc.). When such turn signal indicator(s) fail in a manual vehicle, the human driver may use hand gestures (e.g., put hand out a window of the vehicle) to indicate the intended maneuver of the vehicle to the dynamic objects. However, when such turn signal(s) fail in an autonomous vehicle while no such human driver is present, the vehicle may be unable to inform other objects of the vehicle's intended maneuvers. Consequently, due to a turn signal failing to operate, object(s) proximate the vehicle may predict that the vehicle is intending to perform a certain action (e.g., continue forward, remain in same lane, etc.) when the true intended action of the vehicle may be different (e.g., lane change, turn, etc.). In such instances, the object may rely on the fact that the turn signal is not illuminated when planning a trajectory. Consequently, the object may plan a trajectory which may result in the vehicle and the object colliding. As such, the limitations to the conventional techniques may result in the vehicle performing suboptimal actions and/or providing false or incomplete information to objects proximate the vehicle.

To address these and other technical problems and inefficiencies, the systems and/or techniques described herein include an electrical control unit configured to determine, identify, or otherwise detect one or more turn signal indicators that have become inoperable and/or a planning component configured to generate and/or determine an action for the vehicle to follow based on the inoperable turn signal indicator(s) and the data associated thereto (e.g., position of the turn signal indicator(s) on the vehicle (e.g., front right, back right, etc.)). Technical solutions discussed herein solve one or more technical problems by allowing the vehicle to safely and/or efficiently navigate an environment while one or more turn signal indicators are inoperable.

A vehicle according to examples of this disclosure may be a bidirectional vehicle (or bidirectional autonomous vehicle). A bidirectional vehicle may be able to travel in a first direction and a second direction opposite the first direction, with opposite longitudinal ends of the vehicle able to serve as the front of the vehicle while traveling, depending on the direction of travel. In some examples, the bidirectional vehicle may be a symmetrical vehicle. The symmetrical vehicle can be mirrored across two different axes, a first axis aligned with a length of the vehicle from the first end to the second end and a second axis aligned with the width of the vehicle, perpendicular to the first axis. Accordingly, the symmetrical vehicle may have indistinguishable ends and identical or mirror image quadrants of the vehicle.

In some examples, the four quadrants may form a symmetrical autonomous vehicle. The four quadrants may include a first pair of identical (or nearly identical-looking) turn signal indicator units disposed at two diagonally opposite corners of the vehicle and a second pair of identical turn signal indicator units disposed at two other diagonally opposed corners of the vehicle. The second pair of turn signal indicator units may be a mirror image of the first pair of turn signal indicator units, such that all four quadrants may be substantially indistinguishable to an observer, though, in at least some examples, internal systems and subsystems may vary. The autonomous vehicle may not have a traditional "front" or "rear" and may be configured for symmetrical travel (i.e., able to operate equally in either direction). As an example, the autonomous vehicle may not backup (e.g., reverse) to change direction of travel, and may instead stop driving in a first direction and continue travel in a second direction.

In some examples, the vehicle may include an electrical control unit configured to manage and/or control the electrical-based operations of the vehicle. The electrical control unit may include one or more turn signal controllers which may be configured to manage and/or control the operation of the turn signal indicator units described above. In some examples, the vehicle may include a first turn signal controller configured to manage and/or control the operation of the first pair of turn signal indicator units and a second turn signal controller configured to managed and/or control the operation of the second pair of turn signal indicator units. The turn signal controllers may control the turn signal indicators by sending and/or receiving signals including various instructions.

In some examples, the turn signal controllers may manage and/or control the turn signal indicator lights. That is, prior to performing a lane change or turning maneuver, the turn signal controller(s) may send a signal to the relevant (e.g., left front and left rear turn signals if the vehicle is maneuvering left, right front and right rear turn signals if the vehicle is maneuvering right, etc.) turn signal indicators. In such instances, the signal may instruct the turn signal indicator to illuminate or to stop illuminating. The turn signal controllers may identify which of the four turn signal indicators are relevant based on the intended maneuver (e.g., turn right, change lane, etc.), a location of the turn signal indicator (e.g., within which quadrant the turn signal indicator is located), and/or a position of the turn signal indicator (e.g., front right, back right, front left, back left). In such instances, the turn signal controllers may utilize identifiers of the turn signal indicators to determine which turn signal indicators are located in which quadrants. Based on determining within which quadrant the turn signal indicators are located, the turn signal controllers may determine a position of the turn signal indicators based on a direction of travel of the vehicle. For example, the turn signal controllers may determine that the vehicle is planning to perform a right lane change maneuver with a first longitudinal end being the leading (or front) end. In such instances, the turn signal controller may use the turn signal identifiers and the direction of travel (e.g., the first longitudinal end being the leading end) to determine which turn signal indicators are on the left and right horizontal sides of the vehicle. The controllers may further determine, based on the direction of travel and the locations of the turn signal indicators, a position of the turn signal indicators. In such instances, the turn signal controller(s) may send one or more signals to the front right and/or back right turn signals such that the turn signal indicators illuminate.

As described above, in some examples, one or more of the turn signal indicators may be rendered inoperable. An inoperable turn signal may lack the functionality needed to illuminate or to stop illuminating (e.g., continuously illuminated or flashing). In some examples, a turn signal indicator may be inoperable due to one or more failures of the turn signal indicator and/or one or more failures of the turn signal controller. For example, a turn signal controller may manage and/or control multiple turn signal indicators and as such, if a turn signal controller fails, the turn signal controller may be unable to send signals to the turn signal indicators (managed by the turn signal controller). Thus, the turn signal indicator may be a fully functioning turn signal, but due to the turn signal controller failing (or being unable to send signals), the turn signal indicator may not receive instructions to operate. Alternatively or additionally, a turn signal indicator may fail when the light of the turn signal fails (or goes out), when one or more wires of the turn signal indicator have disconnected or broken, when power to the turn signal indicator is turned off, when the turn signal indicator is stuck illuminating (e.g., the turn signal indicator fails to flash or turn off), etc. In some examples, upon detecting one or more inoperable turn signal indicators, the vehicle may determine a safe and efficient action to follow that minimizes the risk to the vehicle and/or the object(s) proximate the vehicle.

In some examples, the electrical control unit may determine that a turn signal indicator is inoperable. If the turn signal indicator is inoperable due to the failure of the turn signal controller, the electrical control unit may determine that the turn signal indicators are inoperable by identifying that the turn signal controller has failed. That is, the electrical control unit may detect that the turn signal controller has failed (e.g., the controller is not working). The electrical control unit may monitor the status of the turn signal controller and may be configured to identify when the turn signal controller stops communicating or sending status updates. Such a stoppage in communication may indicate that the turn signal controller may be experiencing a failure (or a fault) which may result in a failure in some or all downstream systems or components (e.g., turn signal indicators). For example, if the first turn signal controller has stopped communicating, the electrical control unit may determine that the first turn signal controller has failed. Accordingly, based on the first turn signal controller being configured to manage and/or control the first pair of turn signal indicator units, the electrical control unit may determine that the first pair of turn signal indicator units are inoperable due to the inability of the turn signal controller to send signals (or instructions) to the turn signal indicators. In such cases, to ensure system redundancy, the electrical control unit may enable the second turn signal controller to send signal(s) to the first pair of turn signal indicator units such that these turn signal indicators may receive instruction(s) to operate despite the first turn signal controller being inoperable. In other examples, both the first and second turn signal controllers may send signals to all four turn signal indicators. As such, if one of the turn signal controllers fail, the turn signal indicators may remain operable due to the turn signal indicator receiving signals from the remaining operable turn signal controller.

In other examples, the turn signal controller and/or the electrical control unit may determine that the turn signal indicator is inoperable. If the turn signal indicator is inoperable due to factors associated with the turn signal itself (e.g., broken light, disconnected or broken wiring, etc.), the turn signal controller may detect that the turn signal indicator(s) are inoperable. That is, the turn signal controller may be configured to receive data and/or engage in communication with the turn signal indicators. In such instances, the turn signal controller may receive and/or analyze a current (electrical data) of the turn signal indicator. Based on determining that the current from the turn signal indicator is below a threshold level, the turn signal controller may determine that the there is an open or short circuit and as such, the turn signal indicator has failed. Similarly, additional sensors (e.g., photodiodes or the like) may be used to determine that a signal is being sent to the turn signal indicator with no corresponding output of the indicator.

Based on determining that one or more of the turn signal indicators are inoperable, the vehicle may determine a safe and efficient action for the vehicle to follow. In such examples, since the safety and efficiency of the vehicle's maneuvers may be dependent on the number and/or positions of the remaining functioning turn signals, the vehicle may determine the position of the inoperable turn signal(s) (e.g., front right, back right, back left, front left) and use such data to determine an action that minimizes the impact or risks (to the vehicle or the object(s) proximate the vehicle) associated with navigating the environment with the inoperable turn signal.

Accordingly, the electrical control unit may determine whether the inoperable turn signal indicator(s) is a front (left or right) or rear (left or right) turn signal. Such a determination may be based on a location of the turn signal and/or a direction of travel of the vehicle. That is, to determine the position (or position indication) (e.g., front right, front left, back right, back left) of the turn signal indicator, the electrical control unit May determine a direction of travel of the vehicle. Determining the direction of travel of the vehicle may identify which longitudinal end of the vehicle is the leading or front end and which longitudinal end of the vehicle is the rear or trailing end. In addition to the direction of travel, the electrical control unit may also determine a location (e.g., left side of vehicle or right side of vehicle) and/or a position (e.g., front right, front left, back right, back left) of the turn signal indicators relative to the direction of travel. The location and/or position may be based on determining which quadrant and/or longitudinal end the turn signal indicator(s) correspond to. That is, the electrical control unit may determine that a first longitudinal end of the vehicle is the leading (or front end), that quadrants 1 and 2 correspond to the leading end and quadrants 3 and 4 correspond to the trailing end, that turn signal indicator 1 corresponds to quadrant 1, turn signal indicator 2 corresponds to quadrant 2, turn signal indicator 3 corresponds to quadrant 3, and turn signal indicator 4 corresponds to quadrant 4, that turn signal indicator 1 may be in a front left position, that turn signal indicator 2 may be in a front right position, that turn signal indicator 3 may be in a back left position, and that turn signal indicator 4 may be in a back right position.

Based on determining the position indication (e.g., front right, front left, back right, back left) of the inoperable turn signal indicator, the vehicle (or a planning component) may determine an action for the vehicle to follow that minimizes the use and/or risk induced by the inoperable turn signal. In some examples, the action may include maneuvering to a parking location (e.g., pull over) where passengers may exit the vehicle, coordinating a passenger swap with a second vehicle in a fleet of vehicles and maneuvering to the designated swap location, determining an updated trajectory (or path) to the original destination location that minimizes the use of the inoperable turn signal, modifying the position of the turn signal by changing a direction of travel thereby switching which longitudinal end of the vehicle is the leading end (e.g., back right turn signal becomes the front left turn signal) and/or proceeding to navigate according to an updated path to the original destination, and/or any other type of action. In some examples, the vehicle may generate one or more candidate routes according to some or all of the types of actions.

For example, the vehicle may generate one or more routes to one or more parking locations proximate the vehicle. That is, the vehicle may receive or determine one or more parking locations based at least in part on map data available to the vehicle and/or perception data associated with the environment of the vehicle. A parking location may include a parking lot, a parking space (on the side of a road, in a parking lot, etc.), a median of a road, a shoulder of a road, etc. In such instances, the parking locations may be ranked (relative to the location of the vehicle) or otherwise prioritized based on the quality and/or accessibility of the parking location. For example, the parking location ranking may include parking lot as the highest ranked parking location, parking spaces on the side of a road as the next highest parking location, a shoulder of the road as the next highest ranked, a median as the next highest ranked, and/or on multi-lane roads double parking may be the lowest ranked. However, this is not intended to be limiting; in other examples, the types of parking locations may be ranked or prioritized differently.

Additionally, the vehicle may generate one or more updated routes from the vehicle location to the original destination location. In some examples, the vehicle may be able to continue to the destination location using a same or alternative (or updated) route. That is, the vehicle may generate an updated route that minimizes or otherwise limits the number of lane changes and/or turns that would require the use of the inoperable turn signal. For example, if the front left turn signal indicator is inoperable, the vehicle may generate an updated path to the original destination that does not include, or includes a limited number of, left turns or left lane changes. In such instances, the updated path would allow the vehicle to arrive at the destination with a limited risk of misleading the one or more objects(s) the vehicle may encounter within the environment.

Further, the vehicle may coordinate with a fleet management system to identify a passenger swap location in which the current vehicle and a second vehicle may meet for the passengers to switch vehicles. That is, the vehicle may belong to (or be associated with) a fleet of vehicles. In some examples, the fleet of vehicles may be controlled and/or managed by a fleet management system. The fleet management system may deploy and/or manage any number of vehicles in a fleet. In some examples, when a vehicle determines that one or more of the vehicle's turn signals are inoperable, the vehicle may send such data to the fleet management system (e.g., a remote system). In such examples, the vehicle may send a request to the fleet management system to coordinate a passenger swap with a second vehicle in the fleet of vehicles. That is, the fleet management component may identify a second vehicle in the fleet that may be sufficiently available (e.g., within a threshold distance to the vehicle or the swap location, available passenger seating and/or storage, etc.) and determine a location at which the vehicle and the second vehicle may meet for the passengers of the vehicle to switch to the second vehicle. In such instances, the vehicle may generate one or more routes to the swap location.

In some examples, the vehicle may determine which of the multiple actions (or routes) to follow based on determining a cost (or score) for some or all actions. That is, the vehicle may determine a unique cost value for each action. A low cost value may indicate lower degree of potential risk, inconvenience (to the vehicle, the passengers of the vehicle, or object(s) proximate the vehicle), and/or need to use the inoperable turn signal indicator. Conversely, a high cost value may indicate a heightened degree of potential risks, inconvenience, and/or need to use the inoperable turn signal indicator. In some examples, the vehicle may determine the cost according to the following:

$$\text{Cost} = (W\_Delay * T\_Delay) + W\_Risk * (\Sigma_i \text{Risk\_Turn}\_i + \Sigma_j \text{Risk\_LaneChange}\_j) \quad \text{Equation 1}$$

In this equation, the Cost may correspond to the cost of performing the action, W_Delay may correspond to a weight of the delay introduced due to any deviation from the originally planned route (e.g., the deviation may lead to customer dissatisfaction), T_Delay may correspond to the time delay that was introduced due to any deviation from the originally planned route (e.g., the deviation may lead to customer dissatisfaction), W_Risk may correspond to a weight of the safety risk, i may correspond to a number of turns (of the action) that require the use of the inoperable turn signal(s), Risk_Turn_i may correspond to a risk level associated with the turn number i, j may correspond to a number of unavoidable lane changes (or the action) that require the use of the inoperable turn signal(s), Risk_LaneChange_j may correspond to the risk level associated with the lane change number j.

In some examples, the vehicle may determine the T_Delay value based on the amount of delay introduced to the originally planned route. That is, the vehicle may determine an initial time-to-destination representing the time it would take for the vehicle to navigate from its current position to the destination while following the original route. Further, the vehicle may determine an updated time-to-destination representing the time it would take for the vehicle to navigate from its current position to the destination while following the candidate route (or action). The T_Delay value may correspond to the difference between the initial time-to-destination and the updated time-to-destination. In some examples, the T_Delay value may get larger as the difference gets larger. As such, a large delay introduced by the candidate route (or action) may correlate to a large T_Delay value which may increase the overall Cost value.

In some examples, the vehicle may determine the i value based on the number of turns in the route that require the use of the inoperable turn signal(s). For example, if the front left turn signal indicator is inoperable, the vehicle may determine the number of left turns (e.g., left turns may require the use of the front left turn signal indicator) the vehicle would be required to perform when following a certain action (or route). In other examples, if the back right turn signal indicator is inoperable, the vehicle may determine the number of right turns (e.g., right turns may require the use of the back right turn signal indicator) the vehicle would be required to perform when following a certain action. Thus, i may correspond to the number of turns requiring the faulty turn signal indicator along a particular route. As such, the i value may increase based on the number of turns that require that inoperable turn signal increases which may result in increasing the overall Cost value.

In some examples, the vehicle may determine the Risk_Turn_i value based on a level of risk corresponding to the turn i. That is, if i is three, the vehicle may determine the level of risk associated with the third turn of the route. The vehicle may determine the risk level of a turn based on historical data associated with the specific turn. Historical data may be obtained from one or more remote systems (e.g., live mapping systems representing the region) and/or log data captured by one or more vehicles at the turn at a previous time. The historical data may include a density of traffic (traveling in the same, different, or any direction) at or within a threshold distance from the turn (e.g., a higher density value may correspond to a higher risk value), a speed limit of the road that includes the turn (e.g., a higher speed limit may correlate to a higher risk value-less time for a vehicle to react), an average velocity of traffic at the turn (e.g., a higher average velocity may correlate to a higher risk value), a density or population of pedestrians within a threshold distance of the turn (e.g., a higher number of pedestrians may correlate to a higher risk value), one or more collision reports associated with the intersection (e.g., frequent, recent, and/or a high number of collisions at or around the turn may increase the risk value), and/or any other type of factor. In some examples, the vehicle may determine a risk value for a specific turn (e.g., turn three) of a candidate route (or candidate action) based on combination of the various types of historical data.

In some examples, the vehicle may determine the j value based on the number of unavoidable lane changes along the route that require the use of the inoperable turn signal(s). For example, if the front left turn signal indicator is inoperable, the vehicle may determine the number of unavoidable left lane changes (e.g., left lane changes may require the use of the front left turn signal indicator) the vehicle would be required to perform when following a certain action. In other examples, if the back right turn signal indicator is inoperable, the vehicle may determine the number of unavoidable right lane changes (e.g., right lane changes may require the use of the back right turn signal indicator) the vehicle would be required to perform when following a certain action. Thus, the j value may correspond to the number of unavoidable lane changes that requires the faulty turn signal indicator along a particular route.

In some examples, the vehicle may determine the Risk_LaneChange_j value based on a level of risk corresponding to the lane change j. That is, if j is three, the vehicle may determine the level of risk associated with the third lane change of the route. The vehicle may determine the risk level of a lane change based on historical data associated with the location of the lane change. The historical data may include a density of traffic (traveling in the same, different, or any direction) at or within a threshold distance from the lane change location (e.g., a higher density may correlate to a higher risk value), a speed limit of the road that includes the location of the lane change (e.g., a higher speed limit may correlate to a higher risk value-less time for a vehicle to react), an average velocity of traffic at the location of the lane change (e.g., a higher average velocity may correlate to a higher risk value), a density or population of pedestrians within a threshold distance of the location of the lane change (e.g., a higher number of pedestrians may correlate to a higher risk value), one or more collision reports associated with the location of the lane change (e.g., frequent, recent, and/or a high number of collisions at or around the turn may increase the risk), and/or any other type of factor. In some examples, the vehicle May determine level of risk for a specific lane change (e.g., lane change three) based on combination of the various types of historical data.

Additionally or alternatively, the vehicle may include the parking location rankings (or prioritization level) in the cost determination. Though the parking location rankings are not included in the cost equation above, in other examples, the rank or prioritization of the parking location may contribute to the cost. That is, the vehicle may increase the cost of an action that leads to a low ranked parking location based on the ranking of the parking location. In other examples, the vehicle may decrease the cost value of an action that leads to a high ranked parking location due to the ranking of the parking location. In such cases, the vehicle may determine the cost according to the following:

$$\text{Cost}=(W\_Delay*T\_Delay)+W\_Risk*(ParkingDestination\_Rank+\Sigma_i Risk\_Turn\_i+\Sigma_j Risk\_LaneChange\_j) \quad \text{Equation 2}$$

In this equation, the ParkingDestination_Rank value may correspond to the rank associated with the list of parking spaces. As noted above, the parking locations may be ranked (relative to the location of the vehicle) or otherwise prioritized based on the quality and/or accessibility of the parking location.

In some examples, the vehicle may determine a cost for some or all actions based on the equation above. That is, the vehicle may determine a unique cost value for each of the candidate actions.

Based on determining the cost values for the candidate actions, the vehicle may select or otherwise determine which of the candidate actions to follow. That is, the vehicle may evaluate the cost values of some or all of the candidate actions and select one candidate action to follow. In some examples, the vehicle may select the candidate action with the lowest cost value.

In some examples, upon selecting an action to follow, the vehicle may perform one or more turn signal failure operations to ensure the safety of the vehicle, the object(s) proximate the vehicle, and/or the passengers within the vehicle. That is, depending on the turn or lane change, the vehicle may perform alternative or additional operations to ensure the safety of the maneuver while following the selected action. Such alternative or additional operations may be described below.

For example, when attempting to perform a lane change maneuver and one or both required turn signal indicators are inoperable, the vehicle may determine an expanded gap. A gap may represent a region of the laterally adjacent driving lane to which the vehicle may safely navigate. In such instances, to perform a lane change maneuver, the vehicle may determine or otherwise ensure that the gap is unoccupied (e.g., there are no object(s) in the gap), thereby indicating that the target lane has a gap with sufficient size for the vehicle to safely perform the lane change maneuver. That is, when a vehicle performs a lane change operation, the vehicle may determine a gap in the target lane (e.g., the lane to which the vehicle may navigate). For instance, the vehicle may determine that to perform a safe lane change maneuver, the gap size in the target lane may be 10 m×40 m. That is, so long as the gap is unoccupied, the vehicle may be allowed to perform the lane change maneuver to the target lane. However, since the turn signal indicators may be inoperable, the object(s) in the target lane may be unaware of the vehicle's intended lane change maneuver and/or may rely on the non-illuminated turn signal when determining to perform one or more actions that may cause the object(s) to enter the gap during a time in which the vehicle may be performing the lane change maneuver. As such, to ensure that the vehicle can safely perform the lane change maneuver, the vehicle may determine an expanded gap. The expanded gap may cover a larger region of the target lane such as to decrease the likelihood of the vehicle interacting with object(s) during the lane change maneuver. In some examples, the expanded gap size and/or dimensions may be a threshold (or percent or threshold percent) degree larger than the normal gap size. That is, the expanded gap size may be 10%, 20%, and/or any other percent larger (e.g., longitudinally and/or laterally) than the normal gap. The threshold may be determined based on a possibility of collision, a severity of the potential collision, an environmental factor (e.g., nighttime, city type, rain, snow, fog, wind, etc.), a density of traffic, a velocity of the vehicle, a velocity of the object, a relative velocity between the vehicle and the object, a position (or pose) of the object, a relative position (or pose) between the vehicle and the object, and/or any other factor. Based on determining the expanded gap size, the vehicle may determine whether the region covered by the expanded gap is unoccupied. If the expanded gap is unoccupied (e.g., there are no objects within the region covered by the expanded gap), the vehicle may proceed to perform the lane change maneuver into the region covered by the expanded gap.

For example, the vehicle may determine that the lowest cost action is to park in a parking location on the right side of the road. In this case, the vehicle may be in the left-most lane and as such must perform a right lane change operation. Further, the right rear turn signal indicator may be inoperable. As such, based on the vehicle performing a right lane change maneuver, the vehicle may determine an expanded gap in the target lane (e.g., the driving lane laterally adjacent to the current driving lane). The vehicle may determine whether the region of the environment covered by the expanded gap is unoccupied. Based on the expanded gap being unoccupied, the vehicle may proceed with a lane change operation. In some examples, the vehicle may continue to perform such operations until the vehicle is the right-most lane. Upon entering the right-most lane, the vehicle may navigate at a limited velocity (e.g., a threshold (or percentage) at or below the speed limit) prior to entering the parking location. Navigating at a limited velocity may ensure the vehicle does not dramatically reduce its velocity when attempting to enter the parking space. Such a sudden reduction in velocity when the vehicle has inoperable turn signals may increase the likelihood of an object interacting the vehicle from the rear. Accordingly, the vehicle may be controlled based on the lane changing action and/or the parking action.

In other cases and based on the example above, when perform the right lane change operation with an inoperable rear left turn signal indicator instead of the rear right turn signal indicator, the vehicle may perform the lane change operation according to the normal gap size. That is, if the lane change operation to an opposite direction of the inoperable turn signal indicator (e.g., right lane change with a left inoperable turn signal indicator, left lane change with a right inoperable turn signal indicator), the vehicle may determine and/or be controlled according to a normal gap size instead of the expanded gap size.

Additionally or alternatively, when the vehicle may be attempting to perform a turning maneuver and the relevant turn signal indicator is inoperable, the vehicle may perform a full and/or extended stopping operation. In some examples, dynamic objects (e.g., vehicles, pedestrians, etc.) may rely on the front turn signal indicator of the vehicle when planning its own trajectory. That is, a pedestrian may have an intent to navigate across a crosswalk that is in front of the vehicle. When determining if it is safe to proceed, the pedestrian may look at the front right blinker of the vehicle to determine the intent of the vehicle. Based on the vehicle not having an illuminated turn signal, the pedestrian may proceed to cross the crosswalk. Such actions by the pedestrian may be suboptimal if the turn signal is inoperable and the vehicle has an intent to turn at the crosswalk. As such, to ensure that the vehicle and/or the object(s) proximate the vehicle are able to navigate safely, the vehicle may perform a full stop at the crosswalk. For example, the vehicle may intend to perform a right turn upon entering an intersection. While approaching the intersection, the vehicle may detect one or more object(s) and/or determine that such object(s) have an intent to cross the road (e.g., pedestrian with an intent to cross a crosswalk) or turn into the target lane of the vehicle (e.g., vehicle traveling in the opposite direction of traffic with an intent to perform a left turn into the target lane). In such cases, the vehicle may perform a stopping maneuver (e.g., reduce velocity of the vehicle below a threshold velocity) for a threshold period of time to provide enough time for the object(s) to perform their actions or to predict the intent of the vehicle more accurately. Accordingly, the vehicle may be controlled based on the stopping action and/or the action of turning right.

Alternatively or additionally, in some cases the vehicle may determine that a turn signal indicator is inoperable due being unable to turn off or stop flashing. In such cases, the vehicle may cause the remaining turn signal indicators to illuminate and flash such that all the turn signals are flashing. For example, if the rear right turn signal indicator is flashing and is unable to stop flashing, the vehicle may cause the other three turn signal indicators to start flashing such as to resemble hazard light signals and/or to instruct objects proximate the vehicle to proceed with caution.

Alternatively or additionally, the vehicle may generate actions based on whether the turn signal indicator failed or whether the turn signal controller failed. That is, the vehicle may generate different actions based on the turn signal indicator failing as compared to if the turn signal controller failed. Due to a turn signal controller managing two turn signal indicators, when the turn signal controller fails, the vehicle may prioritize generating actions that mitigate using such inoperable turn signals and/or proceeding to a parking location. In other examples, if the turn signal indicator itself failed, the vehicle may generate actions that mitigate the used of the inoperable turn signal; however, the vehicle may prioritize continuing to a destination (e.g., generate updated path, switch leading end of the vehicle, etc.).

These techniques described herein can improve the functioning, safety, and efficiency of autonomous and semi-autonomous vehicles. Determining actions based on the position of the inoperable turn signal(s) may enable the vehicle to mitigate risks to the vehicle and/or to the object(s) proximate the vehicle. That is, the vehicle may determine actions and/or updated actions that limit the impact and/or use of inoperable turn signal indicators. The vehicle can limit the impact or risks induced by navigating with inoperable turn signal indicators by generating actions or routes that reduce the vehicle maneuvers that require the use of the inoperable turn signal. Reducing the required use of the inoperable turn signal may lessen the likelihood that object(s) in the environment rely on inaccurate turn signal data.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining an action for a vehicle to follow based on a turn signal being inoperable. In this example, some or all of the operations in the example process 100 may be performed by an electrical control unit, perception component, prediction component, a planning component, and/or any other component or systems within an autonomous vehicle. For instance, example process 100 may be implemented using an electrical control unit and/or planning component. As described below in more detail, the electrical control unit may include various components, such as a first turn signal controller, a second turn signal controller, and/or a fault detection component. Further, the planning component may include various components, such as an action generating component and/or an action determining component.

At operation 102, the electrical control unit may determine that a turn signal on the vehicle is inoperable. A vehicle may include one or more turn signal indicators configured to illuminate prior to and/or during a lane change or turning maneuver. As noted above, one or more of the turn signal indicators may become inoperable due to a failure of the turn signal indicator itself and/or a failure of a turn signal controller which controls the turn signal indicator. For example, box 104 illustrates a vehicle with multiple turn signal indicators. In this example, the box 104 may include a vehicle 106 which may include a turn signal indicator 108, a turn signal indicator 110, a turn signal indicator 112, and/or a turn signal indicator 114. As shown, the turn signal indicators may be located or otherwise installed at each corner of the vehicle 106; however, in other examples, such turn signal indicators may be installed at any other location in and/or outside of the vehicle 106.

In some examples, the turn signal indicators may include a turn signal identifier. The turn signal identifier may correspond to a specific turn signal indicator and may be associated with location data, status data, and/or any other type of data of the turn signal indicator. As shown, box 104 may include a box including two columns and three rows. The first column may indicate the turn signal identifier, and the second column may indicate a status of the turn signal indicator. In this example, the turn signal identifier that corresponds to the turn signal indicator 114 may have a status of "inoperable." That is, the turn signal indicator 114 may be inoperable and unable to illuminate. Further, the turn signal identifier that corresponds to the turn signal indicator 110 may have a status of "operable." As such, the turn signal indicator 110 may be fully functioning. Of course, this is merely an example; in other examples, different turn signal indicators may be operational while others are inoperable.

At operation 116, the electrical control unit may determine a position of the inoperable turn signal based on a location of the turn signal and a direction of travel of the vehicle. Turn signal indicators may be important in that they show other object(s) the intended direction of travel for the vehicle 106. As such, the inoperability of certain turn signal indicators may induce more risk than the inoperability of other turn signal indicators. That is, if the vehicle is intending to perform a right lane change, an inoperable right (front or rear) turn signal may induce more risk than if the left turn signal indicators were inoperable. As such, it may be important to determine the position of the inoperable turn signal when planning future actions. For example, box 118 illustrates the vehicle 106 with a box indicating the positions of the turn signal indicators. Since the vehicle 106 may be a bidirectional vehicle, each of the turn signal indicators may be front or rear turn signals based on the which longitudinal end of the vehicle is the leading end. As such, to determine a position of the turn signal indicators, the vehicle may determine a direction of travel. In this case, box 118 illustrates a direction of travel 120. As such, based on the direction of travel 120 and according to the box within box 118, the turn signal indicator 108 may be in a back left position, the turn signal indicator 110 may be in a front left position, the turn signal indicator 112 may be in a front right position, and the turn signal indicator 114 may be in a back right position. However, this example is not intended to be limiting; in other examples the direction of travel 120 may be in a different direction which may result in the turn signal indicator 110 and the turn signal indicator 112 being rear turn signal indicators while the turn signal indicator 108 and the turn signal indicator 114 are front turn signal indicators.

At operation 122, the planning component may determine an action for the vehicle to follow based on the position of the turn signal. In some examples, the vehicle 106 may determine, based on the inoperable turn signal indicator, that proceeding according to the current trajectory may subject the vehicle 106, the passengers of the vehicle 106, and/or the object(s) proximate the vehicle 106 to an unnecessary level of risk. As such, the vehicle 106 may generate candidate actions for the vehicle 106 to follow. Such candidate actions may reduce the level of risk induced by the inoperable turn signal and/or minimize (or limit) the use of the inoperable turn signal. As such, in this case, the vehicle 106 may determine to follow an action that instructs the vehicle 106 to park at the side of a road.

In some examples, based on the vehicle 106 not being in the right-most lane, the vehicle 106 may be required to perform one or more right lane changes in order to arrive in the right-most lane. However, since the inoperable turn signal indicator 114 is a rear right turn signal, performing a right lane change operation may require the use of the inoperable turn signal indicator 114. In order to perform a safe lane change operation, the vehicle 106 may perform turn signal failure operations to enable the vehicle 106 to safely perform the action.

That is, box 124 illustrates the vehicle 106 intending to perform a right lane change operation. The vehicle 106 may perform such an operation such that the vehicle 106 may be able to park on the right-most side of the road. In this case, the box 124 may include a first object and a second object located in the target lane (e.g., right-most lane) of the lane change maneuver. The first object may be located behind the vehicle 106 and the second object may be located in front of the vehicle 106. In order to safely perform the lane change maneuver, the vehicle 106 may generate an expanded gap 126 which may be larger than the normal gap 132. That is, if the vehicle 106 were to perform a lane change operation with all functioning turn signal indicators (or inoperable left turn signal indicators), the vehicle 106 may perform the maneuver according to the gap 132. However, since the right lane change maneuver requires the use of the inoperable turn signal indicator, the vehicle 106 may generate an expanded gap 126 that is a threshold (or threshold percentage) larger than the gap 132.

In some examples, the expanded gap 126 may represent the region of the environment that need be unoccupied for the vehicle 106 to perform the lane change maneuver. In such instances, the vehicle 106 may receive sensor data from one or more sensors of the vehicle 106, detect (or determine) the objects in the environment, and/or determine that such objects are not located in the region of the environment covered by the expanded gap. In this example, the vehicle 106 may determine that the first object and the second object are located outside of the expanded gap 126 and as such, the vehicle 106 may perform the lane change operation.

At operation 128, the planning component may control the vehicle 106 based on the action. Based on determining the action of parking in a parking location along the side of a road and determining that an expanded gap 126 in the target lane is unoccupied, the vehicle 106 may proceed with the lane change maneuver. In such instances, upon entering the target lane (e.g., the right-most lane), the vehicle 106 may enter the intended parking location and perform a parking maneuver. In this example, box 130 may illustrate the vehicle 106 performing the lane change maneuver since the region covered by the expanded gap is unoccupied.

Figure 2:
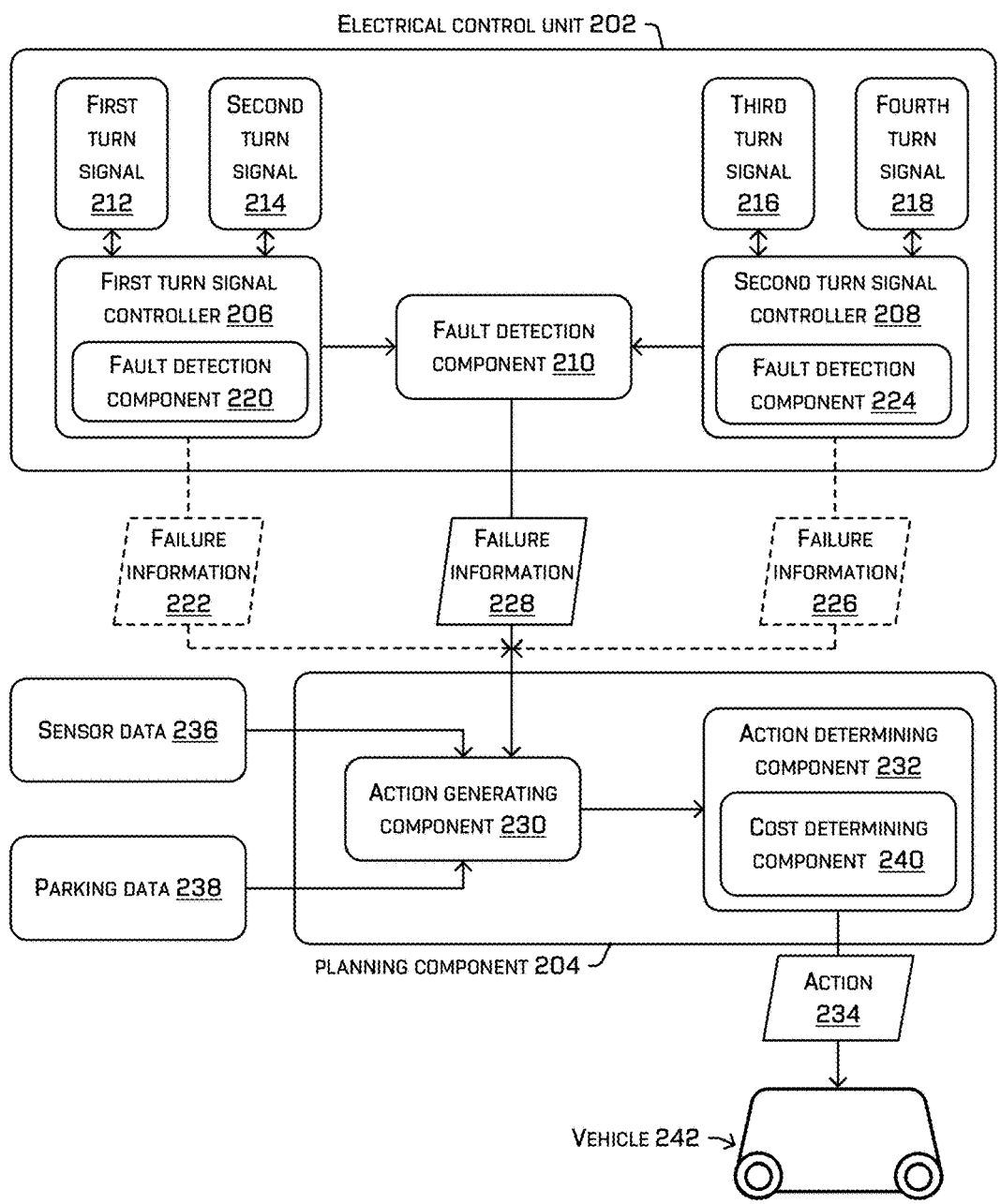
FIG. 2 illustrates an example computing system including an electrical control unit configured to detect inoperable turn signal indicators and a planning component configured to determine an action of a vehicle based on the inoperable turn signal, in accordance with one or more examples of the disclosure.

FIG. 2 illustrates an example computing system 200 including an electrical control unit 202 configured to detect inoperable turn signal indicators and a planning component 204 configured to determine an action of a vehicle based on the inoperable turn signal.

In some examples, the electrical control unit 202 may be similar or identical to the electrical control unit described above, or in other examples herein. As noted above, in some cases, the electrical control unit 202 may be implemented within or otherwise associated with a perception component, a prediction component, and/or a planning component of an autonomous vehicle. In some examples, the electrical control unit 202 may include various components, described below, configured to perform different functionalities of a technique to detect or otherwise identify inoperable turn signals. In some examples, some or all of the subcomponents of the electrical control unit 202 may be integrated in a remote server-based system while other subcomponents may be integrated in on-vehicle systems. In some examples, the electrical control unit 202 may include one or more turn signals indicators configured to illuminate, a first turn signal controller 206 configured to manage and/or control the one or more turn signal indicators, a second turn signal controller 208 configured to manage and/or control the one or more turn signal indicators, and/or a fault detection component 210 configured to detect a failure in one or more turn signal controller and/or turn signal indicators.

In some examples, the electrical control unit 202 may include a first turn signal 212, a second turn signal 214, a third turn signal 216, and/or a fourth turn signal 218. Of course, in other examples, the electrical control unit 202 may include more or fewer turn signals (or turn signal indicators). As described above, the first, second, third, and fourth turn signals may be configured to illuminate or produce light. In this example, the first turn signal 212 and the second turn signal 214 may be instructed to operate by the first turn signal controller 206. Further, the third turn signal 216 and the fourth turn signal 218 may be instructed to operate by the second turn signal controller 208.

In some examples, the turn signals may include various types of data. That is, the turn signals may include identifier data which may be used to distinguish the turn signal indicators from one another. Further, such turn signal identifier data may be mapped to a location on the vehicle. That is, the first turn signal 212 may have a first identifier that indicates that the first turn signal may be located in a first quadrant of the vehicle, the second turn signal 214 may have a second identifier that indicates that the second turn signal may be located in a second quadrant of the vehicle, the third turn signal 216 may have a third identifier that indicates that the third turn signal may be located in a third quadrant of the vehicle, and/or the fourth turn signal 218 may have a fourth identifier that indicates that the fourth turn signal may be located in a fourth quadrant of the vehicle.

In some examples, the electrical control unit 202 may include a first turn signal controller 206 configured to manage and/or control one or more turn signal indicators. As shown, the first turn signal controller 206 may be configured to manage the first turn signal 212 and the second turn signal 214. In this example, the first turn signal 212 and the second turn signal may be on opposite and/or diagonal ends of the vehicle. Of course, in other examples, the first and second turn signals may be on the same or different ends. In some examples, the first turn signal controller 206 may control the first and second turn signals by sending a signal that instructs the turn signal to illuminate. That is, prior to performing a lane change and/or turning maneuver, the first turn signal controller 206 may send a signal to one or both of the first and second turn signals.

In some examples, the first turn signal controller 206 may include a fault detection component 220 configured to detect (or identify) a fault or failure in the first turn signal 212 or the second turn signal 214. The fault detection component 220 may determine that the first turn signal 212 and/or the second turn signal 214 have failed by analyzing electrical data received from the first and second turn signals and/or other sensors associated therewith. That is, the fault detection component 220 may be configured to receive and/or exchange data with the first and second turn signals. The fault detection component 220 may analyze the electrical data (e.g., the current) from the first and second turn signals to determine whether there is an open or short circuit. That is, based on the current being below a threshold level, the fault detection component 220 may determine that there is an open or short circuit and that the respective turn signal has failed, as a result. In such instances, the first turn signal controller 206 may send failure information 222 (e.g., the identifier of the failed turn signal, the location of the failed turn signal, etc.) to the planning component 204.

In some examples, the electrical control unit 202 may include a second turn signal controller 208 configured to manage and/or control the third turn signal 216 and the fourth turn signal 218. In this example, the third turn signal 216 and the fourth turn signal 218 may be on opposite and/or diagonal ends of the vehicle. Of course, in other examples, the first and second turn signals may be on the same or different ends. In some examples, the second turn signal controller 208 may control the third and fourth turn signals by sending a signal that instructs the turn signal to illuminate. That is, prior to performing a lane change and/or turning maneuver, the second turn signal controller 208 may send a signal to one or both of the third and fourth turn signals.

In some examples, the second turn signal controller 208 may include a fault detection component 224 configured to detect (or identify) a fault or failure in the third turn signal 216 or the fourth turn signal 218. In this example, the fault detection component 224 may be similar or identical to the fault detection component 220 of the first turn signal controller 206. The fault detection component 224 may determine that the third turn signal 216 and/or the fourth turn signal 218 have failed based on analyzing electrical data received from the turn signals and/or additional sensors associated therewith. That is, the fault detection component 224 may be configured to receive and/or exchange data with the third and fourth turn signals. The fault detection component 224 may analyze the electrical data (e.g., the current) from the third and fourth turn signals to determine whether there is an open or short circuit. That is, based on the current being below a threshold level, the fault detection component 224 may determine that there is an open or short circuit and that the respective turn signal has failed, as a result. In such instances, the second turn signal controller 208 may send failure information 226 (e.g., the identifier of the failed turn signal, the location of the failed turn signal, etc.) to the planning component 204.

In some examples, the electrical control unit 202 may include fault detection component 210 configured to detect a failure in one or more turn signal controller and/or turn signal indicators. That is, the fault detection component 210 may detect faults and/or failures in the first turn signal controller 206 and/or the second turn signal controller 208. The fault detection component 210 may determine that the first and/or second turn signal controllers have failed based on the lack of communication from the controllers. For instance, the fault detection component 210 may monitor the exchange of data from the first and second turn signal controllers. Based on identifying a stoppage in communication from the first and/or second turn signal controllers, the fault detection component 210 may determine that the respective turn signal controller has failed. Accordingly, the fault detection component 210 may identify which of the turn signal indicators the failed turn signal controller manages and send such data to the planning component 204. For example, if the fault detection component 210 detects that the first turn signal controller 206 has failed, the fault detection component 210 may determine that the first and second turn signals may be inoperable. Based on the first and second turn signals being inoperable, the fault detection component 210 may send failure information 228 (e.g., the identifiers of the failed turn signals, the locations of the failed turn signals, etc.) to the planning component 204.

In additional or alternative examples, the electrical control unit 202 may enable system redundancy such that the turn signal indicators remain operable despite one of the turn signal controllers failing. That is, the electrical control unit 202 may cause the first turn signal controller 206 to send signals to the first, second, third, and fourth turn signals. Further, the electrical control unit 202 may cause the second turn signal controller 208 to send signals to the first, second, third, and fourth turn signals. As such, in an instance in which one of the turn signal controllers fail, the turn signals may still be receiving signals regarding when and/or how to operate. In other examples, the first turn signal controller 206 may send signals to the first and second turn signals and the second turn signal controller 208 may send signals to the third and fourth turn signals. As such, upon determining that either the first or second turn signal controller fails, the remaining operable turn signal controller may proceed to send signals to all four turn signals.

As described above, upon determining that one or more of the turn signals are inoperable, one or more components of the electrical control unit 202 may send the failure information to the planning component 204. The planning component 204 may be configured to generate an action based on the inoperable turn signal.

In some examples, the planning component 204 may be similar or identical to the planning component described above, or in any other examples herein. In some examples, the planning component 204 may include various components, described below, configured to perform different functionalities of an action determining technique. In some examples, some or all subcomponents of the planning component 204 may be integrated in a remote server-based system while other subcomponents may be integrated in on-vehicle systems. In some examples, the planning component 204 may include an action generating component 230 configured to generate one or more candidate actions based on an inoperable turn signal indicator and the position associated thereto and/or an action determining component 232 configured to select (or determine) an action 234 from a list of one or more candidate actions for the vehicle to follow.

In some examples, the planning component 204 may receive sensor data 236 from one or more sensor devices within (or otherwise associated with), perception components, and/or prediction components of the autonomous vehicle. As shown in FIG. 2, the sensor data 236 may be sent to the action generating component 230. In some examples, the sensor data 236 may be representative of the environment and the object(s) located therein proximate the vehicle.

Further, the planning component 204 may receive parking data 238. In some examples, the parking data 238 may include a list of one or more parking locations which may be within a threshold distance of the vehicle. The parking data 238 may be received from a planning component, a prediction component, a database (e.g., on-vehicle database or off-vehicle database) available to the vehicle, and/or any other component. The database may include map data that indicates the locations of parking locations proximate the vehicle. As shown in FIG. 2, the parking data 238 may be sent to the action generating component 230.

In some examples, the planning component 204 may include an action generating component 230 configured to generate one or more candidate actions based on the failure information 228, the sensor data 236, and/or the parking data 238. As shown in FIG. 2, the action generating component 230 may receive sensor data 236, parking data 238, and/or failure information 228. In some examples, the action generating component 230 may use such data to generate one or more actions (or updated routes). Such actions may include maneuvering to a parking location (based on the parking data 238) where passengers may exit the vehicle, coordinating a passenger swap with a second vehicle in a fleet of vehicles and maneuvering to the designated swap location, determining an updated trajectory (or path) to the original destination location that minimizes the use of the inoperable turn signal, modifying the position of the turn signal by switching which longitudinal end of the vehicle is the front end (e.g., back right turn signal becomes the front left turn signal) and/or proceeding to navigate according to an updated path to the original destination, and/or any other type of action. The action generating component 230 may generate one or more updated routes according to some or all types of actions. When generating the actions, the action generating component 230 may generate routes that minimize the impact and/or use of the inoperable turn signal indicators as provided in the failure information 228. In some examples, the action generating component 230 may send the candidate actions to the action determining component 232.

In some examples, the planning component 204 may include an action determining component 232 configured to select (or determine) an action 234 from a list of one or more candidate actions for the vehicle to follow. As shown, the action determining component 232 may receive a list of one or more candidate actions (or candidate routes), sensor data 236, and/or parking data 238 from the action generating component 230. In this example, the action determining component 232 may include a cost determining component 240. The cost determining component may be configured to generate a cost for some or all candidate actions. That is, the cost determining component 240 may generate, based on the sensor data 236 and/or parking data 238, a cost for the list of actions and the action determining component 232 may select (or determine) an action 234 for the vehicle to follow based on the lowest cost value (e.g., the lowest cost indicating the optimal and/or safest action). In some examples, the cost determining component 240 may determine the cost values based on the Equation 1 described above.

Based on determining cost values for the actions, the action determining component 232 may determine an action 234 for the vehicle to follow based on the cost values. In such examples, the action determining component 232 may select the action 234 with the lowest cost value. Upon selecting the action 234, the action determining component 232 and/or the planning component 204 may send the action 234 to the vehicle 242. In such instances, the vehicle 242 may be controlled according to (or based on) the action 234.

Figure 3:
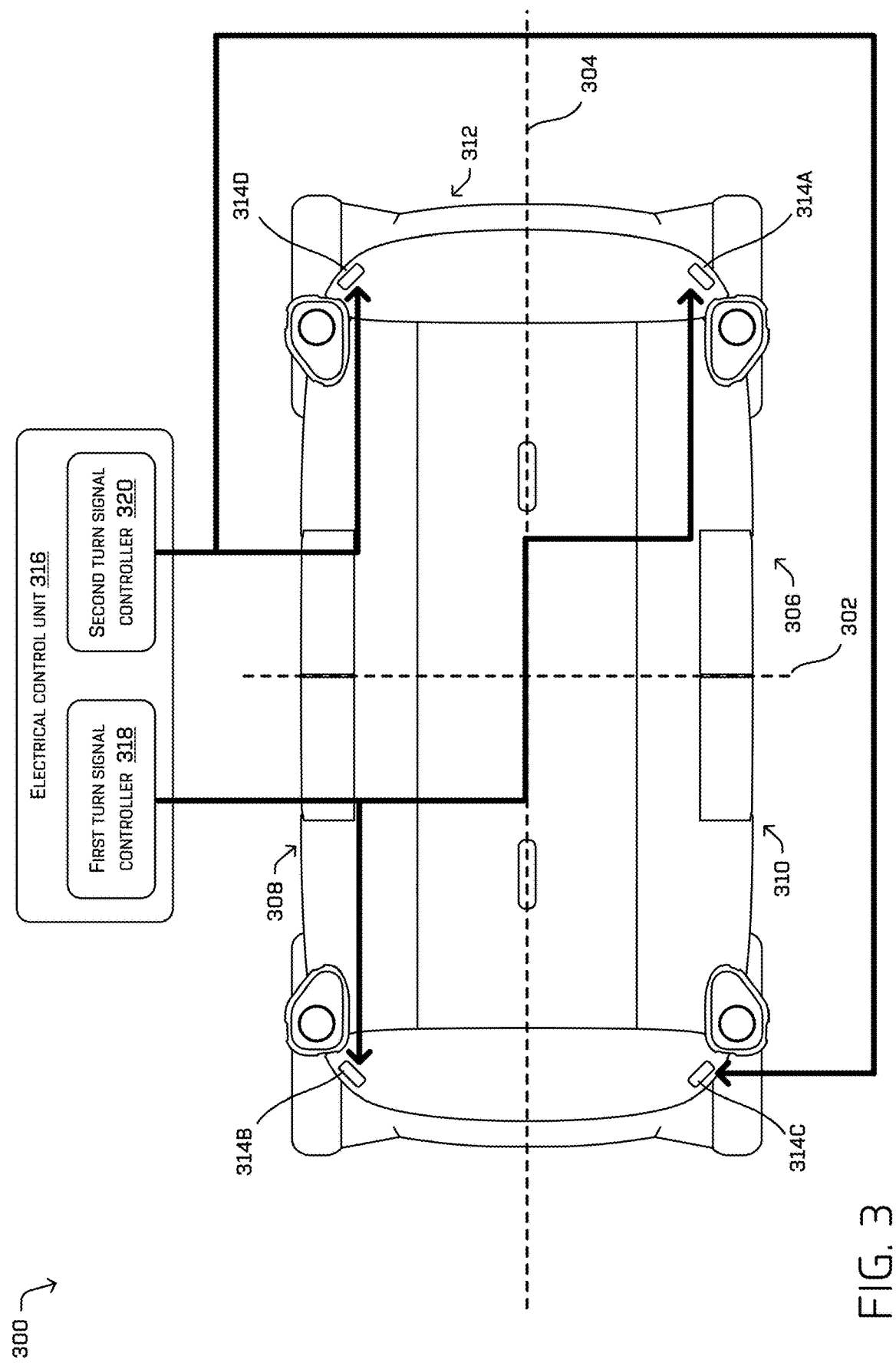
FIG. 3 illustrates an example vehicle including multiple turn signal controllers managing one or more turn signal indicators, in accordance with one or more examples of the disclosure.

FIG. 3 illustrates an example vehicle 300 including multiple turn signal controllers managing one or more turn signal indicators.

In this example, the example vehicle 300 may be a symmetrical vehicle. The vehicle 300 may be symmetric across a first axis 302 and across a second axis 304. The first axis 302 may be aligned with a width of the vehicle 300 and the second axis 304 may be aligned along a length of the vehicle 300. The first axis 302 and the second axis 304 may divide the vehicle 300 into four symmetrical quadrants. In some examples, the quadrants may each include similar and/or identical components (e.g., turn signal indicators, turn signal controllers, etc.). As shown, the first axis 302 and the second axis 304 may create a quadrant 306, a quadrant 308, a quadrant 310, and a quadrant 312. In this example, since each quadrant may be symmetrical, the quadrants may each include a turn signal indicator unit. That is, the quadrant 306 may include a turn signal indicator unit 314A, the quadrant 308 may include a turn signal indicator unit 314B, the quadrant 310 may include a turn signal indicator unit 314C, and the quadrant 312 may include a turn signal indicator unit 314D. In such instances, the turn signal indicator units may be configured to illuminate or produce light. Such turn signal indicator units may be controlled by one or more turn signal controllers.

As shown, FIG. 3 may include an electrical control unit 316 configured to manage and/or control the electrical components of the vehicle 300. In this example, the electrical control unit 316 may include a first turn signal controller 318 and a second turn signal controller 320. As described above, the first and second turn signal controllers may manage and/or control one or more turn signal indicator units. That is, such turn signal controllers may send signals to the turn signal indicator units that instruct the turn signal indicator units to illuminate. As shown by the line(s) exiting the first turn signal controller 318 box, the first turn signal controller 318 may manage and/or control the turn signal indicator unit 314A in the quadrant 306 and the turn signal indicator unit 314B in the quadrant 308. As such, the first turn signal controller 318 may send signals to the turn signal indicator unit 314A and the turn signal indicator unit 314B. Additionally, as shown by the line(s) exiting the second turn signal controller 320 box, the second turn signal controller 320 may manage and/or control the turn signal indicator unit 314C in the quadrant 310 and the turn signal indicator unit 314D in the quadrant 312. As such, the second turn signal controller 320 may send signals to the turn signal indicator unit 314C and the turn signal indicator unit 314D.

In this example, the electrical control unit 316 may determine one or more faults or failures in the first turn signal controller 318 and/or the second turn signal controller 320. Upon determining a failure in the first turn signal controller 318, the electrical control unit 316 may determine that the turn signal indicator unit 314A and the turn signal indicator unit 314B are inoperable. Such a determination may be based on the fact that the turn signal indicator unit 314A and the turn signal indicator unit 314B may not receive a signal to operate since the first turn signal controller 318 has failed. Alternatively or additionally, upon determining a failure in the second turn signal controller 320, the electrical control unit 316 may determine that the turn signal indicator unit 314C and the turn signal indicator unit 314D are inoperable. Such a determination may be based on the fact that the turn signal indicator unit 314C and the turn signal indicator unit 314D may not receive a signal to operate since the second turn signal controller 320 has failed.

Figure 4:
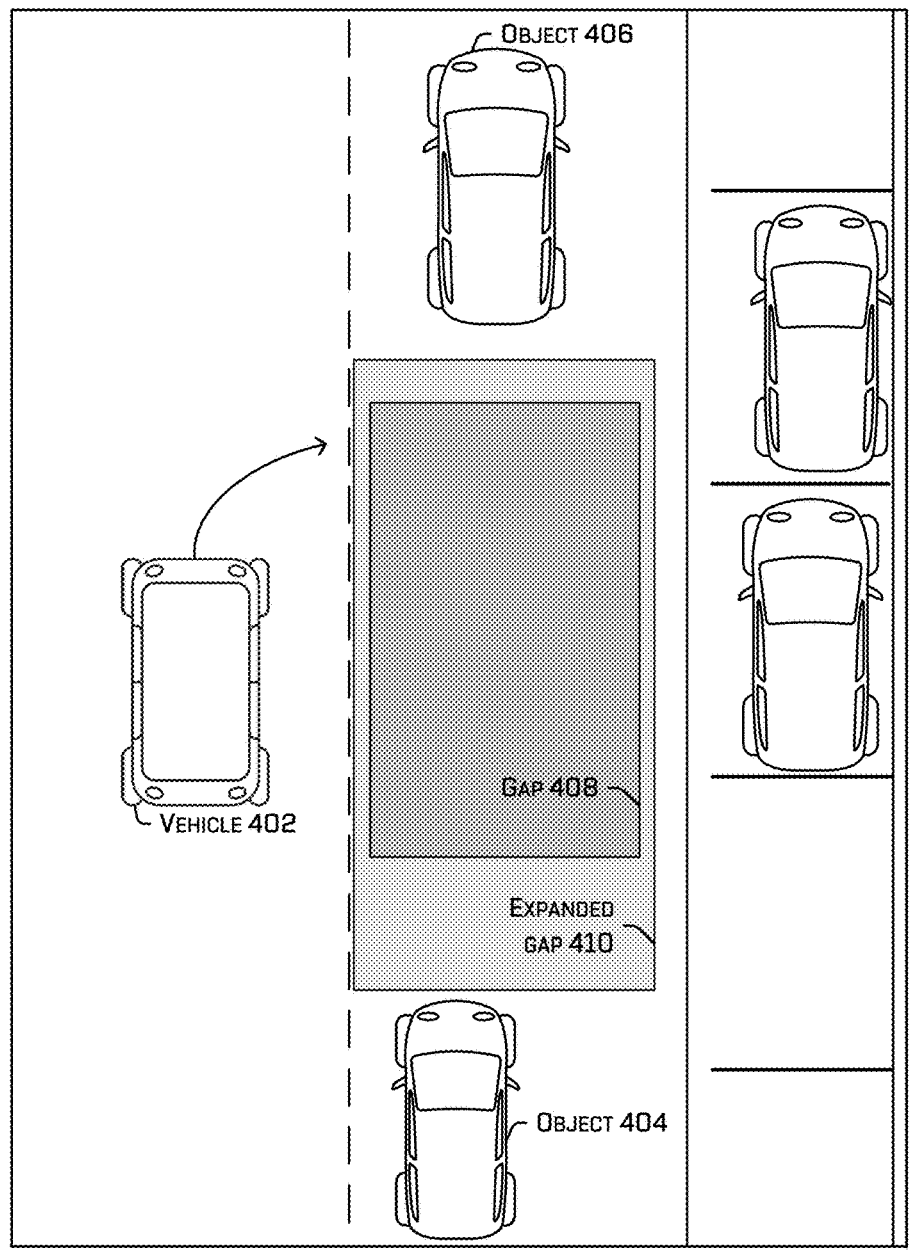
FIG. 4 illustrates an example environment including a vehicle performing a lane change operation based on one or more lane change gaps, in accordance with one or more examples of the disclosure.

FIG. 4 illustrates an example environment 400 including a vehicle performing a lane change operation based on one or more lane change gaps.

In this example, the example environment 400 may be similar or identical to the environments illustrated and/or described throughout. As shown, the example environment 400 may include a vehicle 402 navigating along a road and preparing to perform a lane change maneuver. As shown, the example environment 400 may include an object 404 and/or an object 406. In this example, the object 404 may be a vehicle and the object 406 may be a vehicle; however, in other examples, the objects may be any other type of stationary or dynamic object. As shown, the vehicle 402 may be preparing to perform a lane change maneuver into the driving lane within which the object 404 and the object 406 are located.

As shown in FIG. 4, based on planning a lane change maneuver, the vehicle 402 may generate one or more gaps that represent the region of the environment 400 that may need to be unoccupied for the vehicle 402 to perform the lane change maneuver. In this example, the vehicle 402 may generate a gap 408 which may cover a specific region of the environment. In the event that all of the turn signal indicators of the vehicle 402 are fully functioning, the vehicle 402 may determine that the gap 408 is unoccupied and perform the lane change maneuver. However, if the rear (and/or front) right turn signal indicator of the vehicle 402 is inoperable, the vehicle 402 may generate an expanded gap 410 which may cover a larger region of the environment 400 compared to the gap 408. As indicated above, the object 404 may rely on the rear right turn signal indicator of the vehicle 402 when planning object 404 maneuvers. As such, to ensure the safe and efficient maneuver of the vehicle 402, the expanded gap 410 may be a threshold (or percentage) larger than the gap 408.

In this example, the vehicle 402 may perform the lane change maneuver based on determining that the expanded gap 410 may be unoccupied. As shown, the object 404 and the object 406 may be located outside of the region covered by the expanded gap 410. As such, the vehicle 402 may perform the lane change maneuver.

In other examples, in the event that the front or rear left turn signal indicators of the vehicle 402 are inoperable, the vehicle 402 may operate according to the gap 408, despite having inoperable turn signal indicators. That is, since the right lane change maneuver does not require the use of the left front or rear turn signal indicators, the vehicle 402 and/or the object 404 may be unaffected (e.g., not misled) by the inoperability of the left front and/or rear turn signal indicators.

Figure 5:
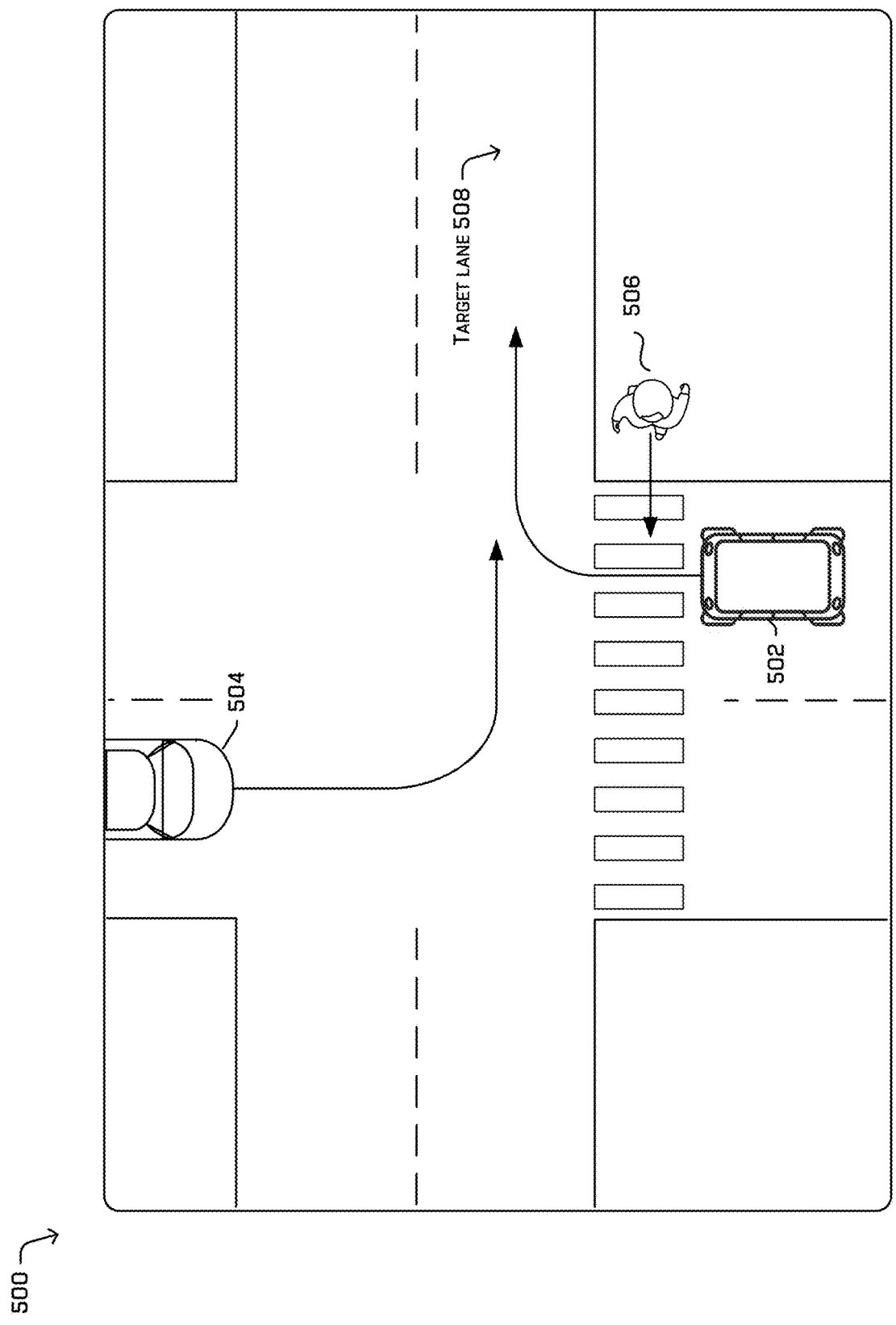
FIG. 5 illustrates an example environment including one or more objects interacting with a path of a vehicle with an inoperable turn signal, in accordance with one or more examples of the disclosure.

FIG. 5 illustrates an example environment 500 including one or more objects interacting with a path of a vehicle with an inoperable turn signal.

In this example, the example environment 500 may include a vehicle 502 navigating along a road and preparing to perform a right turn maneuver. As shown, the example environment 500 may include an object 504 and/or an object 506. In this example, the object 504 may be a vehicle and the object 506 may be a pedestrian; however, in other examples, the objects may be any other type of stationary or dynamic object. As shown, the vehicle 502 may have a trajectory that instructs the vehicle 502 to perform a right turn maneuver into a target lane 508. Further, the object 504 may have an intent or be predicted to perform a left turn maneuver upon entering the junction into the target lane 508. The object 506 may have an intent or be predicted to cross a crosswalk located in front of the vehicle 502. In such cases, the vehicle 502 may determine the intents (or predicted actions) of the object 504 and the object 506 based on the location (or position) or the inoperable turn signal indicator. That is, since the object(s) may behave differently if they can see an illuminated turn signal indicator, the vehicle 502 may predict an updated intent of the objects based on the position of the inoperable turn signal indicator.

In some examples, the vehicle 502 may perform one or more turn signal failure operations based on the inoperability of one or more turn signal indicators of the vehicle 502. That is, the vehicle 502 may perform different operations when performing the turning operation based on a turn signal indicator being inoperable. If the left front and/or rear turn signal indicator(s) are inoperable, the vehicle 502 may proceed according to normal vehicle operations since the left turn signal indicators are not required (are not relevant) for the turning maneuver. However, if the front right turn signal indicator of the vehicle 502 is inoperable, the vehicle 502 may perform a full and/or extended stopping operation since the object 504 and the object 506 may rely on the front right turn signal when performing their own maneuvers. Performing such a stopping operation may allow the object 504 and the object 506 sufficient time to perform their actions and/or properly determine the intent of the vehicle 502.

Figure 6:
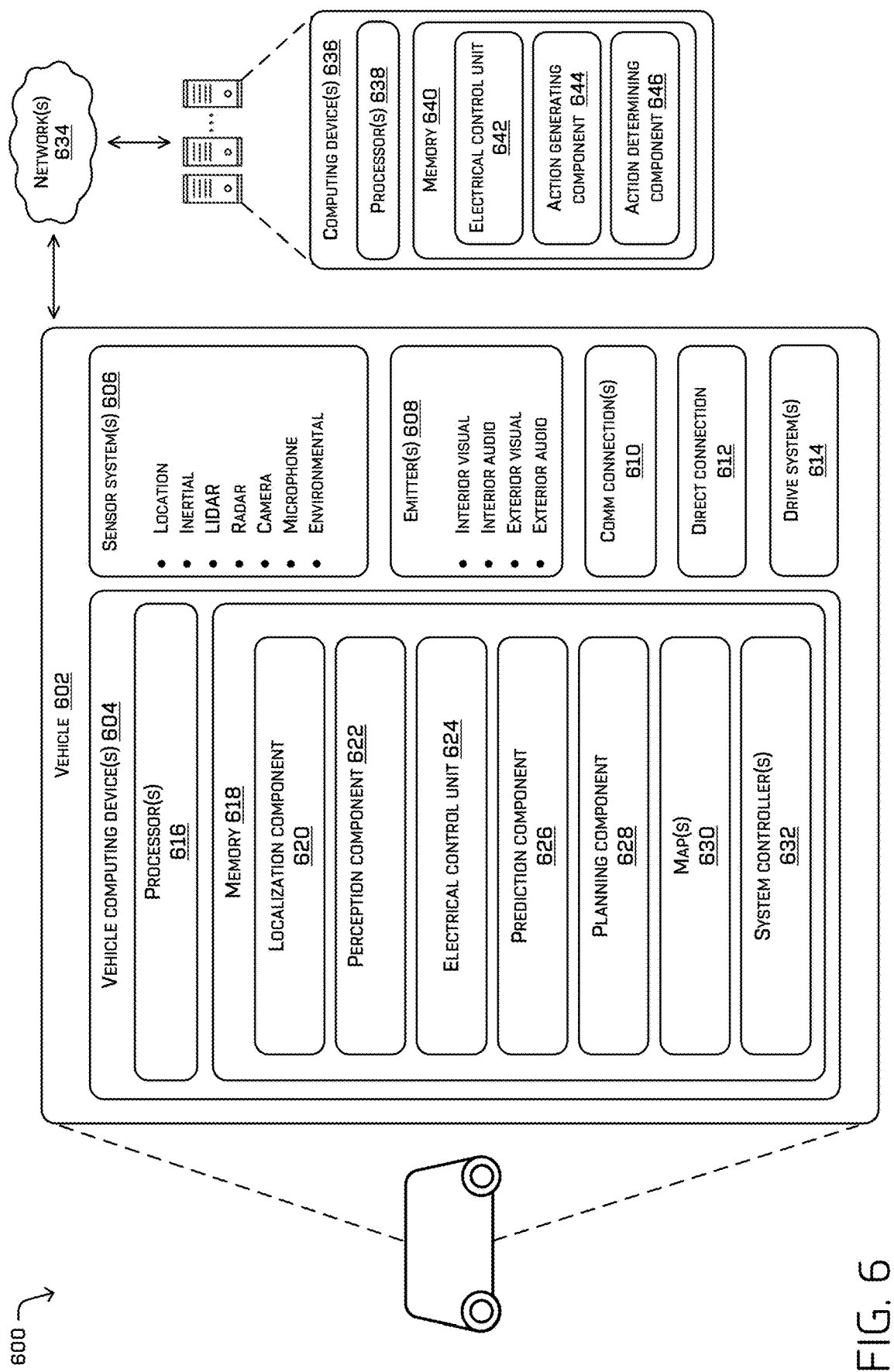
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, an electrical control unit 624, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622, the electrical control unit 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include an electrical control unit 642, an action generating component 644, and an action determining component 646.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.).

In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The electrical control unit 624 may perform any of the techniques described with respect to any of FIGS. 1-5 above with respect to mitigating risks of a vehicle when one or more turn signal indicators are inoperable.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the electrical control unit 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the electrical control unit 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include an electrical control unit 642, an action generating component 644, and an action determining component 646. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the electrical control unit 642, the action generating component 644, and the action determining component 646 may perform substantially similar functions as the electrical control unit 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

Figure 7:
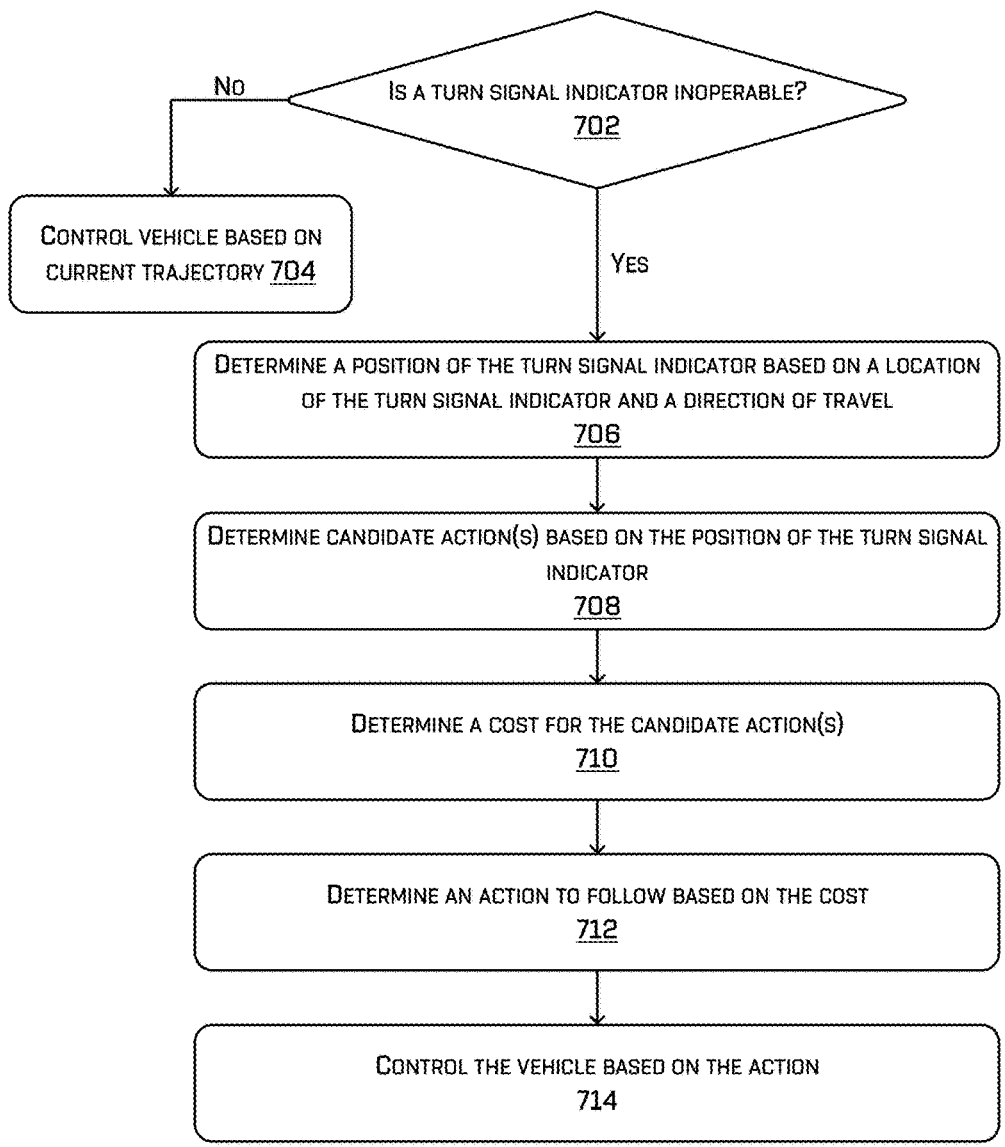
FIG. 7 is a flow diagram illustrating an example process for determining that a turn signal indicator is inoperable, determining a position of the turn signal indicator based on a direction of travel and a location of the turn signal indicator on a vehicle, determining a vehicle action based on the position of the turn signal indicator, and controlling the vehicle based on the action, in accordance with one or more examples of the disclosure.

It should be noted that while FIG. 7 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 7 is a flow diagram illustrating an example process 700 for determining that a turn signal indicator is inoperable, determining a position of the turn signal indicator based on a direction of travel and a location of the turn signal indicator on a vehicle, determining a vehicle action based on the position of the turn signal indicator, and controlling the vehicle based on the action. As described below, the example process 700 may be performed by one or more computer computer-based components configured to implement various functionalities described herein. For instance, process 700 may be performed by an electrical control unit 202 and/or a planning component 204. As described above, the electrical control unit 202 and/or the planning component 204 may be integrated as an on-vehicle system. However, in other examples, the electrical control unit 202 and/or the planning component 204 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the vehicle may determine whether a turn signal indicator is inoperable. In some examples, an electrical control unit of the vehicle may determine that a turn signal indicator is inoperable. If the turn signal indicator is inoperable due to the failure of the turn signal controller, the electrical control unit may determine that the turn signal indicators are inoperable by identifying that the turn signal controller has failed. That is, the electrical control unit may detect that the turn signal controller has failed (e.g., the controller is not working). The electrical control unit may monitor the status of the turn signal controller and may be configured to identify when the turn signal controller stops communicating or sending status updates. Such a stoppage in communication may indicate that the turn signal controller may be experiencing a failure (or a fault) which may result in a failure in some or all downstream systems or components (e.g., turn signal indicators). For example, if the first turn signal controller has stopped communicating, the electrical control unit may determine that the first turn signal controller has failed. Accordingly, based on the first turn signal controller being configured to manage and/or control the first pair of turn signal indicator units, the electrical control unit may determine that the first pair of turn signal indicator units are inoperable due to the inability of the turn signal controller to send signals (or instructions) to the turn signal indicators.

Alternatively or additionally, the turn signal controller and/or the electrical control unit may determine that the turn signal indicator is inoperable. If the turn signal indicator is inoperable due to factors associated with the turn signal itself (e.g., broken light, disconnected or broken wiring, etc.), the turn signal controller may detect that the turn signal indicator(s) are inoperable. That is, the turn signal controller may be configured to receive data and/or engage in communication with the turn signal indicators. In such instances, the turn signal controller may receive and/or analyze a current (electrical data) of the turn signal indicator. Based on determining that the current from the turn signal indicator is below a threshold level, the turn signal controller may determine that the there is an open or short circuit and as such, the turn signal indicator has failed. Thus, if the vehicle determines that a turn signal indicator of the vehicle is operable (fully functioning) (702: No), the vehicle may be controlled based on a current trajectory. That is, at operation 704, the vehicle may control the vehicle based on the current trajectory. Since all the turn signal indicators of the vehicle are fully operational, the vehicle may safely and efficiently navigate the environment without misleading one or more objects proximate the vehicle of the vehicle's intended direction of travel. As such, the vehicle may continue to follow the current trajectory.

In contrast, if the vehicle determines that a turn signal indicator of the vehicle is inoperable (702: Yes), the vehicle may determine one or more actions based on the inoperable turn signal. That is, at operation 706, the vehicle may determine a position of the turn signal indicator based on a location of the turn signal indicator and a direction of travel. Based on determining that one or more of the turn signal indicators are inoperable, the vehicle may determine a safe and efficient action for the vehicle to follow. In such examples, since the safety and efficiency of the vehicle's maneuvers may be dependent on functioning turn signals, the vehicle may determine the position of the inoperable turn signal(s) (e.g., front right, back right, back left, front left) and use such data to determine an action that minimizes the impact or risks (to the vehicle or the object(s) proximate the vehicle) associated with navigating the environment with the inoperable turn signal.

Accordingly, the electrical control unit may determine whether the inoperable turn signal indicator(s) is a front (left or right) or rear (left or right) turn signal. Such a determination may be based on a location of the turn signal and/or a direction of travel of the vehicle. That is, to determine the position (e.g., front right, front left, back right, back left) of the turn signal indicator, the electrical control unit may determine a direction of travel. Determining the direction of travel of the vehicle may identify which longitudinal end of the vehicle is the leading or front end and which longitudinal end of the vehicle is the rear or trailing end. In addition to the direction of travel, the electrical control unit may also determine a location (e.g., left side of vehicle or right side of vehicle) and/or a position (e.g., front right, front left, back right, back left) of the turn signal indicators. The location and/or position may be based on determining which quadrant and/or longitudinal end the turn signal indicator(s) correspond to. That is, the electrical control unit may determine that a first longitudinal end of the vehicle is the leading (or front end), that quadrants 1 and 2 correspond to the leading end and quadrants 3 and 4 correspond to the trailing end, that turn signal indicator 1 corresponds to quadrant 1, turn signal indicator 2 corresponds to quadrant 2, turn signal indicator 3 corresponds to quadrant 3, and turn signal indicator 4 corresponds to quadrant 4, that turn signal indicator 1 may be in a front left position, that turn signal indicator 2 may be in a front right position, that turn signal indicator 3 may be in a back left position, and that turn signal indicator 4 may be in a back right position.

At operation 708, the vehicle may determine candidate action(s) based on the position of the turn signal indicator. Based on determining the position (e.g., front right, front left, back right, or back left) of the inoperable turn signal indicator, the vehicle (or a planning component) may determine an action for the vehicle to follow that minimizes the use and/or risk induced by the inoperable turn signal. In some examples, the action may include maneuvering to a parking location (e.g., pull over) where passengers may exit the vehicle, coordinating a passenger swap with a second vehicle in a fleet of vehicles and maneuvering to the designated swap location, determining an updated trajectory (or path) to the original destination location that minimizes the use of the inoperable turn signal, modifying the position of the turn signal by switching which longitudinal end of the vehicle is the front end (e.g., back right turn signal becomes the front left turn signal) and/or proceeding to navigate according to an updated path to the original destination, and/or any other type of action. In some examples, the vehicle may generate one or more candidate routes according to some or all of the types of actions.

At operation 710, the vehicle may determine a cost for the candidate action(s). In some examples, the vehicle may determine which of the multiple actions (or routes) to follow based on determining a cost (or score) for some or all actions. That is, the vehicle may determine a unique cost value for each action. A low cost value may indicate lower degree of potential risk, inconvenience (to the vehicle, the passengers of the vehicle, or object(s) proximate the vehicle), and/or need to use the inoperable turn signal indicator. Conversely, a high cost value may indicate a heightened degree of potential risks, inconvenience, and/or need to use the inoperable turn signal indicator. In some examples, the vehicle may determine the cost according to Equation 1 as described above.

At operation 712, the vehicle may determine an action to follow based on the cost. Based on determining the cost values for the candidate actions, the vehicle may select or otherwise determine which of the candidate actions to follow. That is, the vehicle may evaluate the cost values of some or all of the candidate actions and select one candidate action to follow. In some examples, the vehicle may select the candidate action with the lowest cost value.

At operation 714, the vehicle may be controlled based on the action. The vehicle may control the vehicle according to one or more turn signal failure operations to ensure the safety of the vehicle, the object(s) proximate the vehicle, and/or the passengers within the vehicle. That is, depending on the turn or lane change, the vehicle may perform alternative or additional operations to ensure the safety of the maneuver while following the selected action.

For example, when attempting to perform a lane change maneuver and one or both required turn signal indicators are inoperable, the vehicle may determine an expanded gap. A gap may represent a region of the laterally adjacent driving lane to which the vehicle may safely navigate. In such instances, to perform a lane change maneuver, the vehicle may determine or otherwise ensure that the gap is unoccupied (e.g., there are no object(s) in the gap), thereby indicating that the target lane has a gap with sufficient size for the vehicle to safely perform the lane change maneuver. That is, when a vehicle performs a lane change operation, the vehicle may determine a gap in the target lane (e.g., the lane to which the vehicle may navigate). For instance, the vehicle may determine that to perform a safe lane change maneuver, the gap size in the target lane may be 10 m×40 m. That is, so long as the gap is unoccupied, the vehicle may be allowed to perform the lane change maneuver to the target lane. However, since the turn signal indicators may be inoperable, the object(s) in the target lane may be unaware of the vehicle's intended lane change maneuver and/or may rely on the non-illuminated turn signal when determining to perform one or more actions that may cause the object(s) to enter the gap during a time in which the vehicle may be performing the lane change maneuver. As such, to ensure that the vehicle can safely perform the lane change maneuver, the vehicle may determine an expanded gap. The expanded gap may cover a larger region of the target lane such as to decrease the likelihood of the vehicle interacting with object(s) during the lane change maneuver. In some examples, the expanded gap size and/or dimensions may be a threshold (or percent) degree larger than the normal gap size. That is, the expanded gap size may be 10%, 20%, and/or any other percent larger (e.g., longitudinally and/or laterally) than the normal gap. The threshold may be determined based on a possibility of collision, a severity of the potential collision, an environmental factor (e.g., nighttime, city type, rain, snow, fog, wind, etc.), a density of traffic, a velocity of the vehicle, a velocity of the object, a relative velocity between the vehicle and the object, a position (or pose) of the object, a relative position (or pose) between the vehicle and the object, and/or any other factor. Based on determining the expanded gap size, the vehicle may determine whether the region covered by the expanded gap is unoccupied. If the expanded gap is unoccupied (e.g., there are no objects within the region covered by the expanded gap), the vehicle may proceed to perform the lane change maneuver into the region covered by the expanded gap.

Additionally or alternatively, when the vehicle may be attempting to perform a turning maneuver and the relevant turn signal indicator is inoperable, the vehicle may perform a full and/or extended stopping operation. In some examples, dynamic objects (e.g., vehicles, pedestrians, etc.) may rely on the front turn signal indicator of the vehicle when planning its own trajectory. That is, a pedestrian may have an intent to navigate across a crosswalk that is in front of the vehicle. When determining if it is safe to proceed, the pedestrian may look at the front right blinker of the vehicle to determine the intent of the vehicle. Based on the vehicle not having an illuminated turn signal, the pedestrian may proceed to cross the crosswalk. Such actions by the pedestrian may be suboptimal if the turn signal is inoperable and the vehicle has an intent to turn at the crosswalk. As such, to ensure that the vehicle and/or the object(s) proximate the vehicle are able to navigate safely, the vehicle may perform a full stop at the crosswalk. For example, the vehicle may intend to perform a right turn upon entering an intersection. While approaching the intersection, the vehicle may detect one or more object(s) and/or determine that such object(s) have an intent to cross the road (e.g., pedestrian with an intent to cross a crosswalk) or turn into the target lane of the vehicle (e.g., vehicle traveling in the opposite direction of traffic with an intent to perform a left turn into the target lane). In such cases, the vehicle may perform a stopping maneuver to provide enough time for the object(s) to perform their actions or to predict the intent of the vehicle more accurately. Accordingly, the vehicle may be controlled based on the stopping action and/or the action of turning right.

EXAMPLE CLAUSES

A: A system comprising: one or more processors; and one or more non-transitory computer-readable media storing computer-executable instructions that, when executed, cause the system to perform operations comprising: determining, based at least in part on a first signal, that a turn signal indicator of a bidirectional autonomous vehicle has failed; determining a direction of travel associated with the bidirectional autonomous vehicle; determining a location of the turn signal indicator on the bidirectional autonomous vehicle; determining, based at least in part on the direction of travel and the location of the turn signal indicator, a position indication of the turn signal indicator being positioned at a front or a rear of the bidirectional autonomous vehicle; determining, based at least in part on the position indication and the location of the turn signal indicator, an action for the bidirectional autonomous vehicle to follow; determining, based at least in part on a cost associated with the action, to follow the action; and controlling the bidirectional autonomous vehicle based at least in part on action.

B: The system of paragraph A, the operations further comprising: determining that the action includes a lane change maneuver; determining, based at least in part on the position indication of the turn signal indicator and the lane change maneuver, that the turn signal indicator is relevant to the lane change maneuver; and determining a first gap associated with performing the lane change maneuver that is a threshold percent larger than a second gap, the second gap associated with lane change maneuvers for which the turn signal indicator is not relevant, wherein controlling the bidirectional autonomous vehicle is based at least in part on the first gap.

C: The system of paragraph A, wherein the action is a first action and the cost is a first cost, and wherein determining to follow the first action comprises: determining, based at least in part on the position indication and the location of the turn signal indicator, a second action for the bidirectional autonomous vehicle; determining a second cost associated with the second action; and causing, based at least in part on comparing the first cost and the second cost, the bidirectional autonomous vehicle to follow the first action.

D: The system of paragraph C, wherein at least one of the first cost or the second cost is determined based at least in part on at least one of: a delay introduced by the action, a number of turns along a route that use the turn signal indicator, a number of lane changes along the route that use the turn signal indicator, a first overall level of risk associated with the number of turns, a second overall level of risk associated with the number of lane changes, or a rank of a parking location associated with the action E: The system of paragraph C, wherein the first cost is determined based at least in part on: determining, based at least in part on the action, first level of risk associated with performing a first turn along a route that uses the turn signal indicator; determining, based at least in part on the action, a second level of risk associated with performing a second turn along the route that uses the turn signal indicator; and determining the first cost based on a sum of the first level of risk and the second level of risk.

F: One or more non-transitory computer-readable media storing instructions executable by one or more processors, wherein the instructions, when executed, cause a system to perform operations comprising: determining, based at least in part on a signal, that one or more of a turn signal indicator or a turn signal controller of a vehicle is inoperable; determining a direction of travel associated with the vehicle; determining, based at least in part on the direction of travel and a position of the turn signal indicator on the vehicle, an action for the vehicle to perform; determining, based at least in part on a cost associated with the action, to follow the action; and controlling the vehicle based at least in part on action.

G: The one or more non-transitory computer-readable media of paragraph F, the operations further comprising: determining that the action includes a lane change maneuver; determining, based at least in part on the position of the turn signal indicator and the lane change maneuver, that the turn signal indicator is relevant to the lane change maneuver; determining a first gap associated with performing the lane change maneuver that is a threshold percent larger than a second gap, the second gap associated with lane change maneuvers for which the turn signal indicator is not relevant; and controlling the vehicle based at least in part on the first gap.

H: The one or more non-transitory computer-readable media of paragraph G, wherein controlling the vehicle based at least in part on the first gap comprises: receiving, from a sensor associated with the vehicle, sensor data representative of an environment; determining, based at least in part on the sensor data, that a region of the environment covered by the first gap is unoccupied; and causing, based at least in part on the first gap being unoccupied, the vehicle to perform the lane change maneuver.

I: The one or more non-transitory computer-readable media of paragraph F, the operations further comprising: determining that the action includes a turning maneuver; detecting, based at least in part on sensor data of an environment, an object; determining, based at least in part on the sensor data and the position of the turn signal indicator, an intent of the object; determining, based at least in part on the position of the turn signal indicator, the intent of the object, and the turning maneuver, an updated action, wherein the updated action includes reducing a velocity of the vehicle below a threshold velocity; and controlling the vehicle based at least in part on the updated action.

J: The one or more non-transitory computer-readable media of paragraph F, wherein the action is a first action and the cost is a first cost, and wherein determining to follow the first action comprises: determining, based at least in part on the position, a second action for the vehicle; determining a second cost associated with the second action; and causing, based at least in part on comparing the first cost and the second cost, the vehicle to follow the first action.

K: The one or more non-transitory computer-readable media of paragraph J, wherein at least one of the first cost or the second cost is determined based at least in part on at least one of: a delay introduced by the action, a number of turns along a route that use the turn signal indicator, a number of lane changes along the route that use the turn signal indicator, a first overall level of risk associated with the number of turns, a second overall level of risk associated with the number of lane changes, or a rank of a parking location associated with the action.

L: The one or more non-transitory computer-readable media of paragraph F, wherein the cost is determined based at least in part on: determining, based at least in part on the action, a first level of risk associated with performing a first turn along a route that uses the turn signal indicator; determining, based at least in part on the action, a second level of risk associated with performing a second turn along the route that uses the turn signal indicator; and determining the first cost based on a sum of the first level of risk and the second level of risk.

M: The one or more non-transitory computer-readable media of paragraph L, wherein determining the first level of risk is based at least in part on at least one of: a density of traffic within a threshold distance from a location of the first turn, a speed limit of a road that includes the first turn, an average velocity of traffic at the location of the first turn, a density of pedestrians within the threshold distance from the location of the first turn, or a report of a collision at the location of the first turn.

N: The one or more non-transitory computer-readable media of paragraph F, wherein determining that the turn signal indicator is inoperable comprises: receiving, from the turn signal indicator, electrical data indicative of a current; determining that the electrical data fails to satisfy a threshold level; and determining, based at least in part on the electrical data of the turn signal indicator failing to satisfy the threshold level, that the turn signal is inoperable.

O: The one or more non-transitory computer-readable media of paragraph F, wherein the turn signal controller is a first turn signal controller, the operations further comprising: determining that the first turn signal controller is inoperable; determining that the first turn signal controller manages the turn signal indicator; and causing, based at least in part on the first turn signal controller being inoperable, a second turn signal controller to send a second signal to the turn signal controller.

P: A method comprising: determining, based at least in part on a signal, that one or more of a turn signal indicator or a turn signal controller of a vehicle is inoperable; determining a direction of travel associated with the vehicle; determining, based at least in part on the direction of travel and a position of the turn signal indicator on the vehicle, an action for the vehicle to perform; determining, based at least in part on a cost associated with the action, to follow the action; and controlling the vehicle based at least in part on action.

Q: The method of paragraph P, further comprising: determining that the action includes a lane change maneuver; determining, based at least in part on the position of the turn signal indicator and the lane change maneuver, that the turn signal indicator is relevant to the lane change maneuver; determining a first gap associated with performing the lane change maneuver that is a threshold percent larger than a second gap, the second gap associated with lane change maneuvers for which the turn signal indicator is not relevant; and controlling the vehicle based at least in part on the first gap.

R: The method of paragraph P, wherein the action is a first action and the cost is a first cost, and wherein determining to follow the first action comprises: determining, based at least in part on the position, a second action for the vehicle; determining a second cost associated with the second action; and causing, based at least in part on comparing the first cost and the second cost, the vehicle to follow the first action.

S: The method of paragraph R, wherein at least one of the first cost or the second cost is determined based at least in part on at least one of: a delay introduced by the action, a number of turns along a route that use the turn signal indicator, a number of lane changes along the route that use the turn signal indicator, a first overall level of risk associated with the number of turns, a second overall level of risk associated with the number of lane changes, or a rank of a parking location associated with the action.

T: The method of paragraph P, wherein the cost is determined based at least in part on: determining, based at least in part on the action, a first level of risk associated with performing a first turn along a route that uses the turn signal indicator; determining, based at least in part on the action, a second level of risk associated with performing a second turn along the route that uses the turn signal indicator; and determining the first cost based on a sum of the first level of risk and the second level of risk.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
determining, based at least in part on a first signal, that a turn signal indicator of a bidirectional autonomous vehicle has failed;
determining a direction of travel associated with the bidirectional autonomous vehicle;
determining a location of the turn signal indicator on the bidirectional autonomous vehicle;
determining, based at least in part on the direction of travel and the location of the turn signal indicator, a position indication of the turn signal indicator being positioned at a front or a rear of the bidirectional autonomous vehicle;
determining, based at least in part on the position indication and the location of the turn signal indicator, an action for the bidirectional autonomous vehicle to follow, wherein determining the action is further based at least in part on the turn signal indicator being excluded from the action;
determining, based at least in part on a cost associated with the action, to follow the action; and
controlling the bidirectional autonomous vehicle based at least in part on action.

2. The system of claim 1, the operations further comprising:
determining, based at least in part on the turn signal indicator, a second action;
determining that the second action includes a lane change maneuver;
determining, based at least in part on the position indication of the turn signal indicator and the lane change maneuver, that the turn signal indicator is relevant to the lane change maneuver; and
determining a first gap associated with performing the lane change maneuver that is a threshold percent larger than a second gap, the second gap associated with lane change maneuvers for which the turn signal indicator is not relevant,
wherein controlling the bidirectional autonomous vehicle is based at least in part on the first gap.

3. The system of claim 1, wherein the action is a first action and the cost is a first cost, and wherein determining to follow the first action comprises:
determining, based at least in part on the position indication and the location of the turn signal indicator, a second action for the bidirectional autonomous vehicle;
determining a second cost associated with the second action; and
causing, based at least in part on comparing the first cost and the second cost, the bidirectional autonomous vehicle to follow the first action.

4. The system of claim 3, wherein at least one of the first cost or the second cost is determined based at least in part on at least one of:
a delay introduced by the first action or the second action,
a number of turns along a route that use the turn signal indicator,
a number of lane changes along the route that use the turn signal indicator,
a first overall level of risk associated with the number of turns,
a second overall level of risk associated with the number of lane changes, or
a rank of a parking location associated with the first action or the second action.

5. The system of claim 3, wherein the second cost is determined based at least in part on:
determining, based at least in part on the second action, first level of risk associated with performing a first turn along a route that uses the turn signal indicator;
determining, based at least in part on the second action, a second level of risk associated with performing a second turn along the route that uses the turn signal indicator; and
determining the second cost based on a sum of the first level of risk and the second level of risk.

6. One or more non transitory computer readable media storing instructions executable by one or more processors, wherein the instructions, when executed, cause a system to perform operations comprising:
determining, based at least in part on a signal, that one or more of a turn signal indicator or a turn signal controller of a vehicle is inoperable;
determining a direction of travel associated with the vehicle;
determining, based at least in part on the direction of travel and a position of the turn signal indicator on the vehicle, an action for the vehicle to perform, wherein determining the action is further based at least in part on the turn signal indicator being excluded from the action;
determining, based at least in part on a cost associated with the action, to follow the action; and
controlling the vehicle based at least in part on action.

7. The one or more non transitory computer readable media of claim 6, the operations further comprising:
determining, based at least in part on the turn signal indicator, a second action;
determining that the second action includes a lane change maneuver;
determining, based at least in part on the position of the turn signal indicator and the lane change maneuver, that the turn signal indicator is relevant to the lane change maneuver;
determining a first gap associated with performing the lane change maneuver that is a threshold percent larger than a second gap, the second gap associated with lane change maneuvers for which the turn signal indicator is not relevant; and
controlling the vehicle based at least in part on the first gap.

8. The one or more non transitory computer readable media of claim 7, wherein controlling the vehicle based at least in part on the first gap comprises:
receiving, from a sensor associated with the vehicle, sensor data representative of an environment;
determining, based at least in part on the sensor data, that a region of the environment covered by the first gap is unoccupied; and
causing, based at least in part on the first gap being unoccupied, the vehicle to perform the lane change maneuver.

9. The one or more non transitory computer readable media of claim 6, the operations further comprising:
determining, based at least in part on the turn signal indicator, a second action;

determining that the second action includes a turning maneuver;

detecting, based at least in part on sensor data of an environment, an object;

determining, based at least in part on the sensor data and the position of the turn signal indicator, an intent of the object;

determining, based at least in part on the position of the turn signal indicator, the intent of the object, and the turning maneuver, an updated action, wherein the updated action includes reducing a velocity of the vehicle below a threshold velocity; and controlling the vehicle based at least in part on the updated action.

10. The one or more non transitory computer readable media of claim 6, wherein the action is a first action and the cost is a first cost, and wherein determining to follow the first action comprises:

determining, based at least in part on the position, a second action for the vehicle;

determining a second cost associated with the second action; and causing, based at least in part on comparing the first cost and the second cost, the vehicle to follow the first action.

11. The one or more non transitory computer readable media of claim 10, wherein at least one of the first cost or the second cost is determined based at least in part on at least one of:

a delay introduced by the first action or the second action, a number of turns along a route that use the turn signal indicator, a number of lane changes along the route that use the turn signal indicator, a first overall level of risk associated with the number of turns, a second overall level of risk associated with the number of lane changes, or a rank of a parking location associated with the first action or the second action.

12. The one or more non transitory computer readable media of claim 10, wherein the second cost is determined based at least in part on:

determining, based at least in part on the second action, a first level of risk associated with performing a first turn along a route that uses the turn signal indicator;

determining, based at least in part on the second action, a second level of risk associated with performing a second turn along the route that uses the turn signal indicator; and determining the second cost based on a sum of the first level of risk and the second level of risk.

13. The one or more non transitory computer readable media of claim 12, wherein determining the first level of risk is based at least in part on at least one of:

a density of traffic within a threshold distance from a location of the first turn, a speed limit of a road that includes the first turn, an average velocity of traffic at the location of the first turn, a density of pedestrians within the threshold distance from the location of the first turn, or a report of a collision at the location of the first turn.

14. The one or more non transitory computer readable media of claim 6, wherein determining that the turn signal indicator is inoperable comprises:

receiving, from the turn signal indicator, electrical data indicative of a current;

determining that the electrical data fails to satisfy a threshold level; and determining, based at least in part on the electrical data of the turn signal indicator failing to satisfy the threshold level, that the turn signal indicator is inoperable.

15. The one or more non transitory computer readable media of claim 6, wherein the turn signal controller is a first turn signal controller, the operations further comprising:

determining that the first turn signal controller is inoperable;

determining that the first turn signal controller manages the turn signal indicator; and causing, based at least in part on the first turn signal controller being inoperable, a second turn signal controller to send a second signal to the turn signal controller.

16. A method comprising:

determining, based at least in part on a signal, that one or more of a turn signal indicator or a turn signal controller of a vehicle is inoperable;

determining a direction of travel associated with the vehicle;

determining, based at least in part on the direction of travel and a position of the turn signal indicator on the vehicle, an action for the vehicle to perform, wherein determining the action is further based at least in part on the turn signal indicator being excluded from the action;

determining, based at least in part on a cost associated with the action, to follow the action; and controlling the vehicle based at least in part on action.

17. The method of claim 16, further comprising:

determining, based at least in part on the turn signal indicator, a second action;

determining that the second action includes a lane change maneuver;

determining, based at least in part on the position of the turn signal indicator and the lane change maneuver, that the turn signal indicator is relevant to the lane change maneuver;

determining a first gap associated with performing the lane change maneuver that is a threshold percent larger than a second gap, the second gap associated with lane change maneuvers for which the turn signal indicator is not relevant; and controlling the vehicle based at least in part on the first gap.

18. The method of claim 16, wherein the action is a first action and the cost is a first cost, and wherein determining to follow the first action comprises:

determining, based at least in part on the position, a second action for the vehicle;

determining a second cost associated with the second action; and causing, based at least in part on comparing the first cost and the second cost, the vehicle to follow the first action.

19. The method of claim 18, wherein at least one of the first cost or the second cost is determined based at least in part on at least one of:
- a delay introduced by the first action or the second action,
- a number of turns along a route that use the turn signal indicator,
- a number of lane changes along the route that use the turn signal indicator,
- a first overall level of risk associated with the number of turns,
- a second overall level of risk associated with the number of lane changes, or
- a rank of a parking location associated with the first action or the second action.

20. The method of claim 18, wherein the second cost is determined based at least in part on:
- determining, based at least in part on the second action, a first level of risk associated with performing a first turn along a route that uses the turn signal indicator;
- determining, based at least in part on the second action, a second level of risk associated with performing a second turn along the route that uses the turn signal indicator; and
- determining the second cost based on a sum of the first level of risk and the second level of risk.

* * * * *